United States Patent
McDonagh et al.

(10) Patent No.: US 7,134,552 B1
(45) Date of Patent: Nov. 14, 2006

(54) FOOD PAN CARRIER

(75) Inventors: Richard McDonagh, Oklahoma City, OK (US); James H. Cook, Wellston, OK (US); Martin R. Benning, Yukon, OK (US); Kent A. Birt, Moore, OK (US); Larry B. Henderson, Oklahoma City, OK (US); Ronald J. Meredith, Edmond, OK (US)

(73) Assignee: Carlisle FoodService Products, Incorporated, Oklahoma City, OK (US)

( * ) Notice: Subject to any disclaimer, the term of this patent is extended or adjusted under 35 U.S.C. 154(b) by 338 days.

(21) Appl. No.: 10/392,404

(22) Filed: Mar. 19, 2003

(51) Int. Cl.
*A45C 11/20* (2006.01)

(52) U.S. Cl. ............ 206/545; 206/557; 206/564; 62/3.62

(58) Field of Classification Search ......... 206/267, 206/468, 518, 545, 557, 558, 561, 532, 563, 206/564; 62/3.6, 3.62; 312/401, 405
See application file for complete search history.

(56) References Cited

U.S. PATENT DOCUMENTS

| | | | |
|---|---|---|---|
| 3,199,579 A | 8/1965 | Foster et al. | |
| 3,631,630 A * | 1/1972 | Buffington et al. | 49/402 |
| 4,045,102 A * | 8/1977 | Austin | 312/61 |
| 4,269,461 A * | 5/1981 | Roach, Jr. | 312/244 |
| 4,376,558 A | 3/1983 | Bandar | |
| 4,531,635 A * | 7/1985 | Cleveland | 206/457 |
| 4,668,484 A * | 5/1987 | Elliott | 422/113 |
| 4,688,352 A * | 8/1987 | Kinoshita | 49/209 |
| 4,775,002 A | 10/1988 | Iwamoto | |
| 5,320,244 A * | 6/1994 | Yu | 220/507 |
| 5,431,490 A * | 7/1995 | Edwards | 312/116 |
| 5,454,471 A | 10/1995 | Norvell | |
| 5,501,338 A | 3/1996 | Preston | |
| 6,446,459 B1 * | 9/2002 | Sawhney et al. | 62/440 |
| 6,525,659 B1 * | 2/2003 | Jaffe et al. | 340/545.6 |

* cited by examiner

*Primary Examiner*—Kurt Fernstrom
(74) *Attorney, Agent, or Firm*—McAfee & Taft

(57) ABSTRACT

The food pan carrier has a pan carrier body and a pan carrier door. The pan carrier door is slidable relative to the pan carrier body from an open to a closed position. When the door is in the closed position, the food pan carrier will maintain food that has been heated to at least 185° at a minimum of 141° for an extended period of time. The pan carrier body has grooves in which the food pan door is received. The food pan door preferably has rails that are slidable in the grooves. The door slides in the grooves from a second end to a first end of the grooves. As the door slides from the open to the closed position, it moves toward a sealing surface that circumscribes an opening through which food pans are inserted and removed from the pan carrier body. In the fully closed position, the door sealingly engages the sealing surface that circumscribes the opening through which food pans are inserted and removed.

20 Claims, 19 Drawing Sheets

FOOD PAN CARRIER

BACKGROUND OF THE INVENTION

This invention relates to catering and food service equipment, and more particularly to food pan carriers which comprise a pan carrier body and a door slidable relative to the body.

In the catering and food service industry, food carried in food pans is transported in a number of different types of equipment, depending on the size and shape of the pan in which the food is placed. The equipment in which the food pans are carried are typically referred to as food pan carriers. Prior art food pan carriers are shown in FIGS. 1–4. FIG. 1 shows a prior art food pan carrier which generally may be designated as a side loader. The side loader is designated as such because the equipment is hinged to allow a side to open so that food pans may be placed in the side loader and removed therefrom. Side loaders have different shapes and sizes to accommodate a variety of sizes of food pans.

Another food pan carrier, designated as an end loader is shown in FIG. 2. End loaders will typically accommodate all full-size food pans of varying depth, including but not limited to 6-inch, 4-inch and 2½-inch pans. FIGS. 3 and 4 show food pans carriers which may be designated top loaders. Top loaders are manufactured in a variety of sizes including but not limited to 4-inch single pans carriers, 6-inch single pan carriers and combination pan carriers. Food pan carriers are typically constructed of a plastic, and specifically are comprised of a plastic shell filled with an insulating material, such as an insulating foam. The doors, or lids of the food pan carriers are typically attached with separate metal or plastic hinges and utilize metal or plastic latches to close the doors so that food is maintained at the desired temperature for a desired amount of time. Generally, food must be maintained at a temperature above 141° F. Existing food pan carriers are typically designed to maintain food heated to a temperature of 185° F. at a temperature of at least 141° F. for an extended period of time, and preferably usually for a minimum of about six hours. Although such food pan carriers work adequately, they are constructed of a number of different pieces to allow the doors and/or lids for the food pan carriers to open and close adequately. A variety of metal screws and other fasteners are necessary to attach hinges and latches, which are typically metal, and metal pins are typically used as hinge pins. Thus, while the food pan carriers known in the prior art work adequately, food pan carriers of fewer parts are desirable. In addition to expense that could be saved with such a food pan carrier, many institutions, such as, for example prisons, restrict the type of materials that can be utilized within the confines of the institution.

SUMMARY OF THE INVENTION

The present invention is directed to a food pan carrier comprised of a pan carrier body and a pan carrier door, or lid. The food pan door is slidable relative to the pan carrier body between open and closed positions. When the food pan door is in the closed position, the food pan door will sealingly engage the pan carrier body to maintain food and food pans carried by the pan carrier bodies at a desired temperature for a desired amount of time. For example, the food pan carriers of the present invention will hold food heated to a temperature of 185° F. at a minimum of 141° F. for at least about six hours and has been shown to maintain food heated to 185° F. at 141° F. for as much as fifteen hours.

The food pan carrier defines a doorway or door opening through which food pans may be inserted and removed when the door is in the open position. A body sealing surface circumscribes the opening. The door has a door sealing surface that will sealingly engage the body sealing surface when it is in the closed position. The pan carrier body has first and second grooves therein. The grooves slope from an outer or first end thereof to an inner or second end thereof towards the body sealing surface. The door is slidable in the grooves and when it moves from the open toward the closed position will therefore move toward the body sealing surface. The door preferably has first and second rails that are received in the first and second grooves. The first and second rails on the door slope from the second end to the first end thereof towards the door sealing surface. The rails on the door slope towards the sealing surface on the door at an angle the same or about the same as the angle with which the grooves slope towards the body sealing surface. When the door, or lid is in the closed position, the door will seal sufficiently to maintain food originally heated to the temperature of 185° F. at a temperature of 141° F. for at least about six hours and has been shown to maintain such food at a temperature of at least 141° F. for in excess of ten hours, and as long as fifteen hours.

BRIEF DESCRIPTION OF THE DRAWINGS

FIG. 29 is a view from line 29—29 of FIG. 20.

DETAILED DESCRIPTION OF A PREFERRED EMBODIMENT

Figure 1:
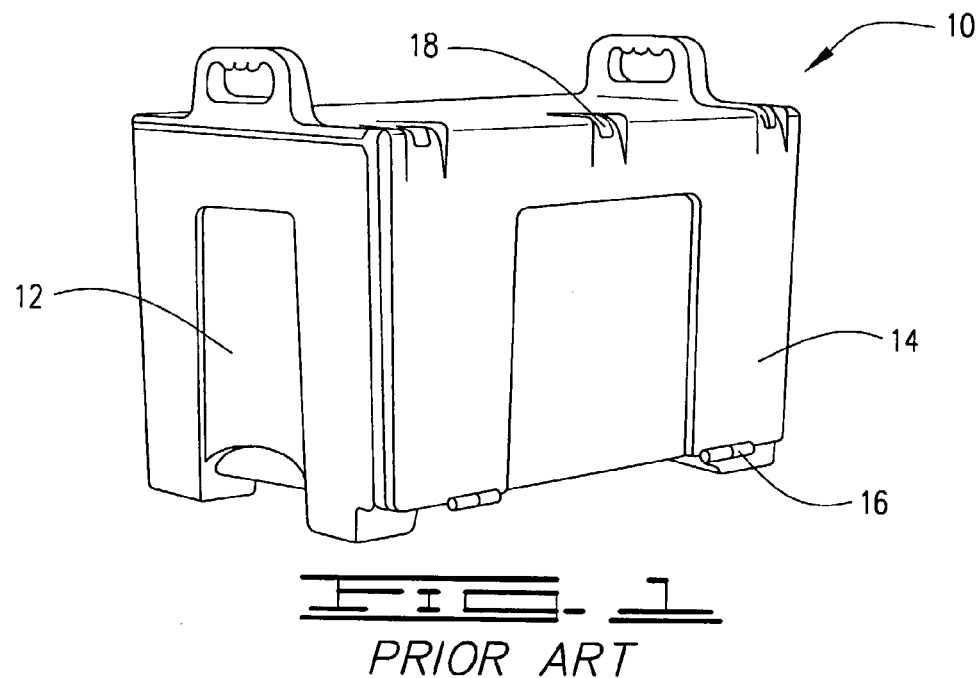
FIGS. 1–4 are perspective views of prior art food pan carriers
Figure 2:
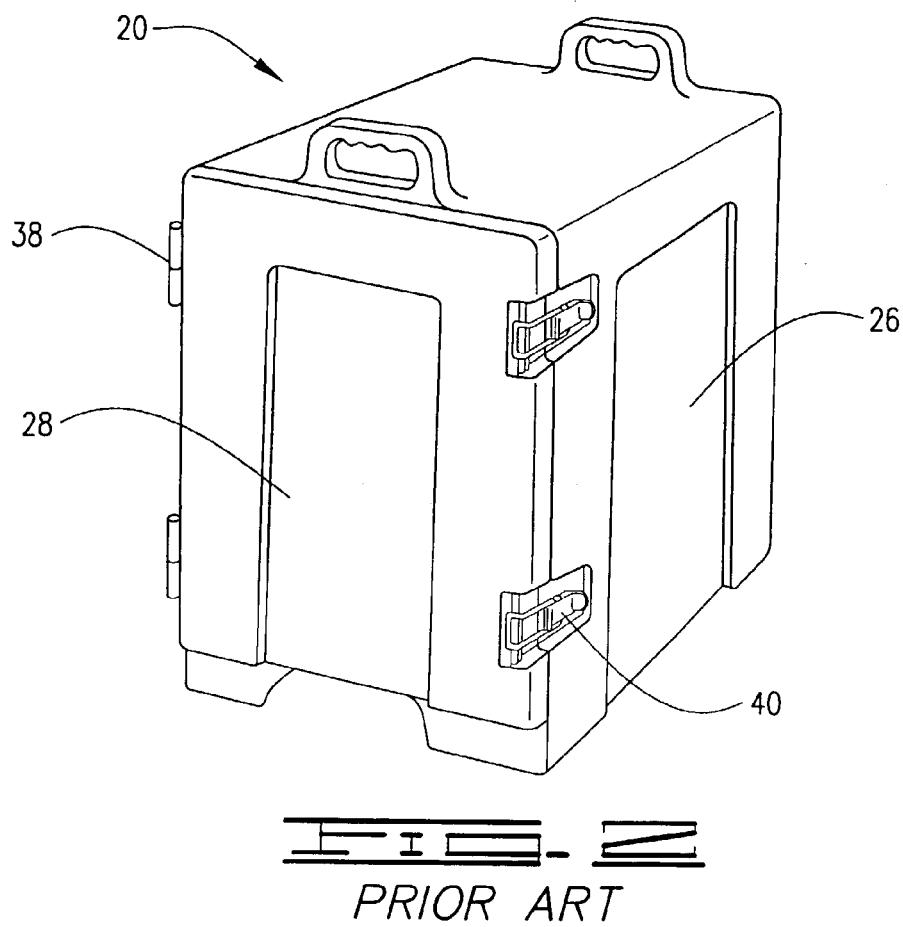
Figure 3:
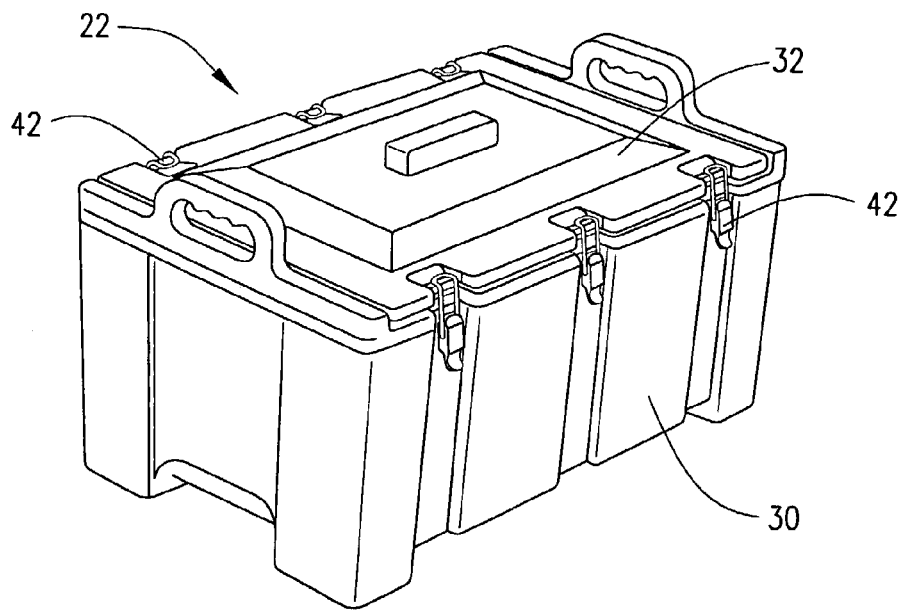
Figure 4:
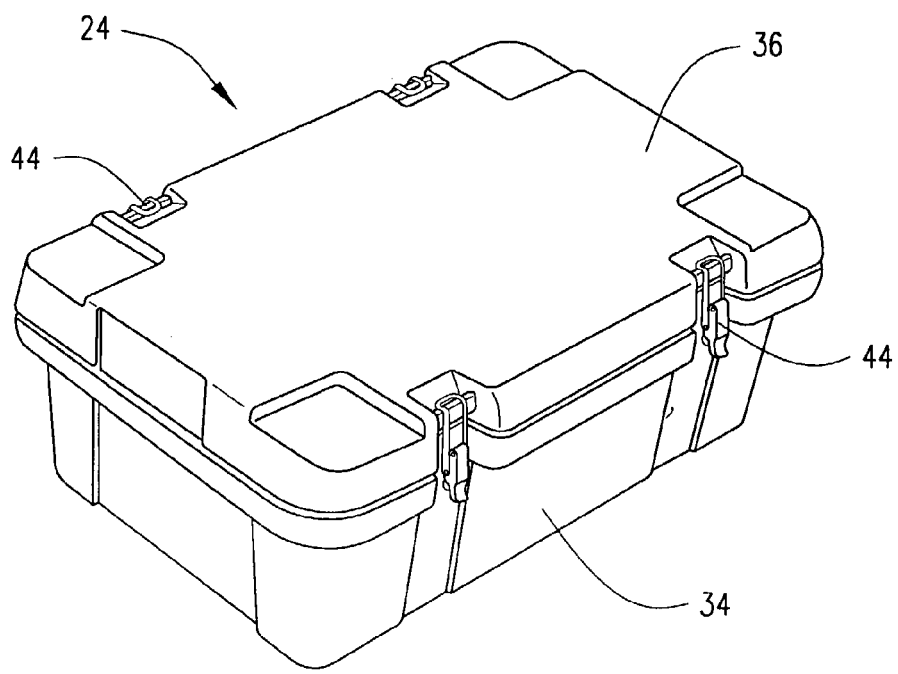

Referring to FIGS. 1, 2, 3 and 4, prior art food pan carriers are shown. FIG. 1 shows a food pan carrier 10 which may be commonly referred to as a side loader 10. Side loader 10 includes the pan carrier box 12 with a door 14 connected thereto. Door 14 is attached with hinges 16 and latches 18 which typically will be screwed or fastened to the box and the door by means known in the art, and which will typically include a number of metal parts. FIG. 2 is a representation of a food pan carrier 20 which may be referred to as an end loader 20. FIGS. 3 and 4 show food pan carriers 22 and 24 which may be referred to as top loaders 22 and 24. End loader 20 comprises a pan carrier body 26 and a pan carrier door or lid 28. Top loader 22 comprises a pan carrier body 30 and a pan carrier door or lid 32. Likewise, top loader 24 comprises a pan carrier body 34 and a pan carrier door or lid 36. Pan carriers 20, 22 and 24 all include hinges and/or latches that include a variety of metal parts such as metal inserts, metal braces and metal hinge pins along with screws or other types of fasteners required to attach hinges and/or latches to the pan carrier bodies and the doors. For example, end loader 20 includes hinges 38 and latch assemblies 40. Pan carrier 22 includes a plurality of latch assemblies 42. Likewise pan carrier 24 includes a plurality of latch assemblies 44. As is apparent from the drawings, the hinges and latch assemblies on the food pan carriers 10, 20, 22 and 24 are multi-piece assemblies that will include a number of parts, many of which will be metal parts.

Figure 5:
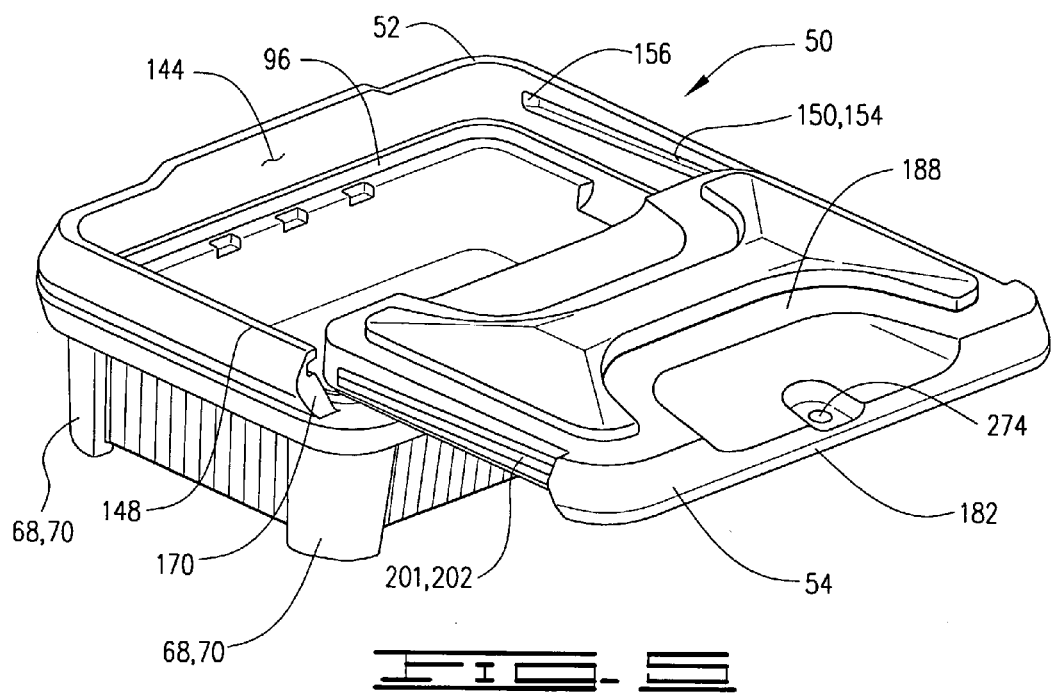
FIG. 5 shows a perspective view of the food pan carrier of the present invention showing the front and left sides thereof.
Figure 6:
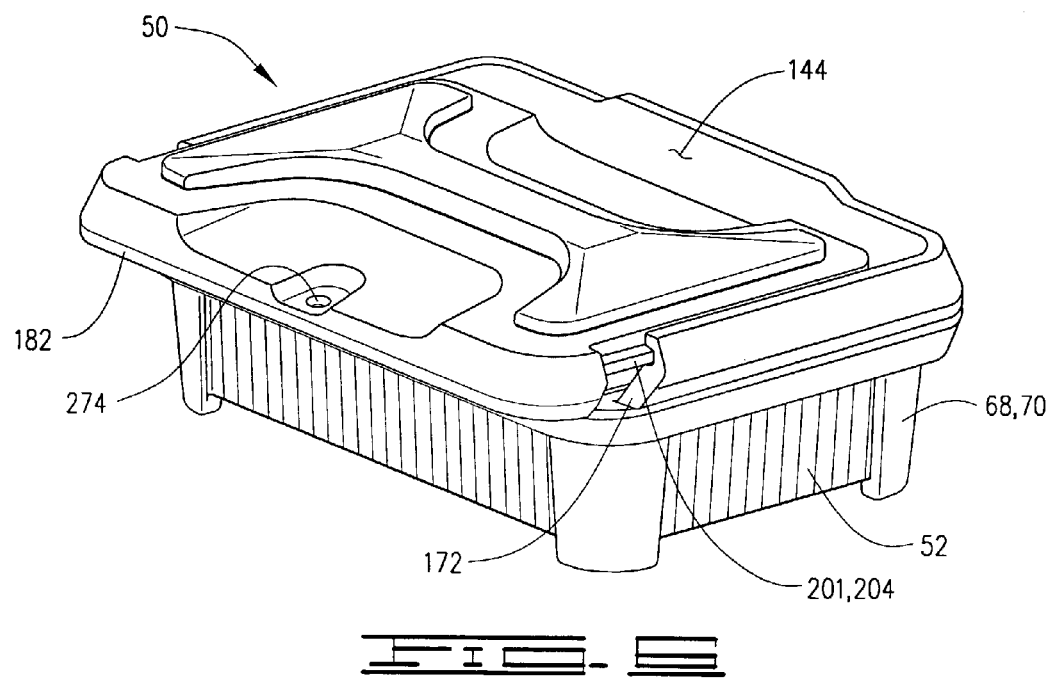
FIG. 6 is a perspective view showing the front and right sides of the food pan carrier of the present invention with the door or lid partially closed.
Figure 7:
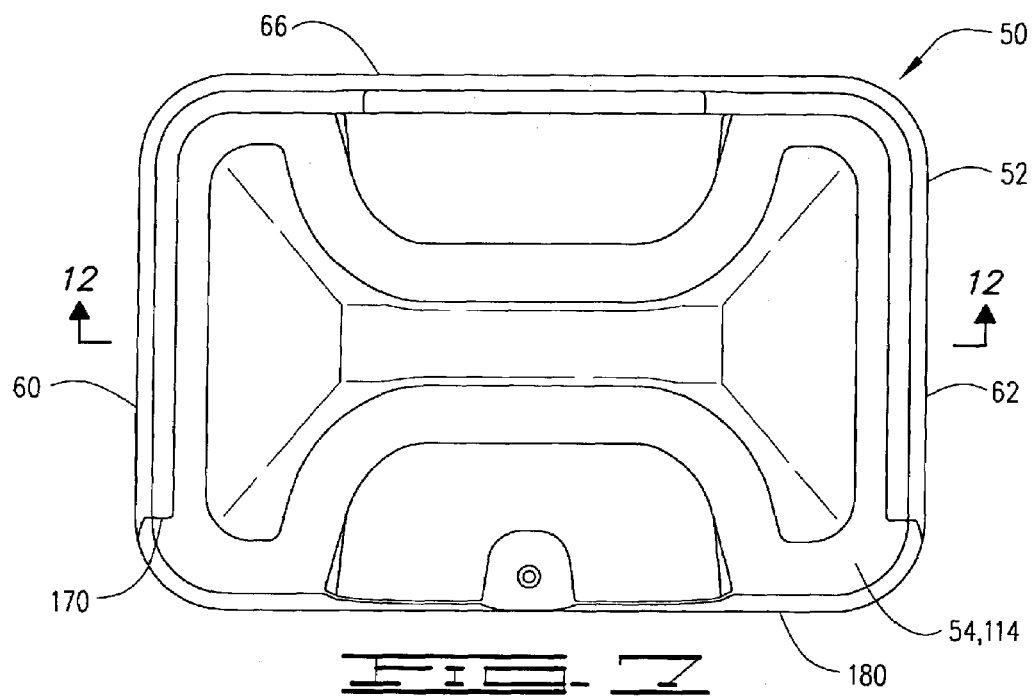
FIG. 7 is a top view of the food pan carrier of the present invention.

Referring now to FIG. 5, a food pan carrier 50 of the present invention is shown. Food pan carrier 50 may be referred to as a top loader 50. Top loader 50 has a pan carrier body 52, which may be also referred to as a food pan receptacle, and a food pan door or lid 54. Pan carrier body 52 and lid 54 are comprised of a plastic shell, such as for example, a polyethylene shell filled with an insulating foam, which may be a two-part expandable foam known in the art, such as a two-part foam consisting of isocyanate and polyol. Thus, pan carrier body 52 may comprise a shell 53 filled with an insulating foam, and a food pan door may comprise a shell 55 filled with an insulating foam. Pan carrier body 52 comprises a bottom or bottom wall 56 having a plurality of sides or side walls 58 projecting upwardly therefrom. Walls 58 may include left and right side walls 60 and 62, respectively, and front and rear or back side walls 64 and 66, respectively. Pan carrier body 52 has legs 68 at the corners 70 thereof. Legs 68 extend downwardly from bottom wall 56 so that when food pan carrier body 52 is placed on a surface such as a ground surface, table surface or other flat surface, bottom wall 56 is spaced from the surface on which pan carrier body 52 is positioned. Pan carrier body 52 defines a food pan or food receiving cavity 72 in which food pans may be placed for transport or simply for storage and keeping food in the pans above a desired temperature.

Pan carrier body 52 has an outer surface 74 and an inner surface 76. Bottom wall 56 has outer surface 77 and inner surface 78. Left side wall 60 has outer surface 80 and inner surface 82. Right side wall 62 has outer surface 84 and inner surface 86. Front wall 64 has outer surface 88 and inner surface 90 and back wall 66 has outer surface 92 and inner surface 94.

Left and right side walls 60 and 62 and front and back side walls 64 and 66 define a peripheral ledge 96 upon which food pans may be placed. A plurality of notches and in the embodiment shown three notches 98 are defined in ledge 96 in both the front and back walls 64 and 66, respectively. Food pans may be placed directly on ledge 96 and, as is known in the art, divider bars may be placed in notches 98 and 100 to divide food pan cavity 72 so that different sized food pans may be placed therein. Notches 102 and 104 in the left and right side walls 60 and 62 provide for easy access to grasp and remove food pans. The use of divider bars in top loaders is known in the art and provides for the use of a variety of different sizes of food pans.

Pan carrier body 52 also includes a sealing lip or door seal bead 110. Sealing lip 110 circumscribes cavity 72 above ledge 96. Food pan lid 54 is movable between an open position 112, wherein the door is disengaged from the pan carrier body 52 or retracted sufficiently so that food pans may be placed in pan carrier body 52 or removed therefrom, to a closed position 114. In the closed position 114 of food pan lid 54, lid 54 will sealingly engage sealing lip 110 to maintain food in food pans placed in food pan carrier 50 at a desired temperature for a desired amount of time. For example, food must be maintained at a temperature above 141° F. which is the minimum safe temperature for the food. With the current invention, it has been shown that food heated to 185° F. will be maintained at a temperature at or above 141° F. for a significant period of time, for example up to ten to thirteen hours. The minimum desired time at which the temperature should be held to at least 141° F. when food is heated to at least 185° F. is about six hours. Lid 54 will sealingly engage sealing lip 110 around the entire periphery 116 of food receiving cavity 72 at opening 117 thereof, which may also be referred to as doorway or door opening 117. Food pans may be placed in or removed from pan carrier body 52 through opening, or doorway 117. Because of the nature of the product and the plastics utilized, there may not be a perfect seal in that there may be small areas wherein sealing lip 110 is not in intimate contact with lid 54. However, lid 54 and sealing lip 110 will engage sufficiently to maintain food at the desired temperature, namely at least 141° F. for the desired amount of time, namely, a minimum of six hours and preferably longer. Sealingly engage means that the lid 54 and sealing lip 110 engage sufficiently to maintain food at the desired temperature of 141° F. for the desired amount of time, namely, at least about six hours. Upper surface 118 of sealing lip 110, which may be referred to as a body sealing surface 118, preferably defines a plane 120.

Sealing lip 110 projects upwardly from an upper end 122 of forward or front side wall 64. Left side wall 60 has a lower wall portion 124 and an upper wall portion 126. Right side wall 62 has a lower wall portion 128 and an upper wall portion 130. Rear wall 66 has a lower wall portion 132 and an upper wall portion 134.

Figures 10, 11:
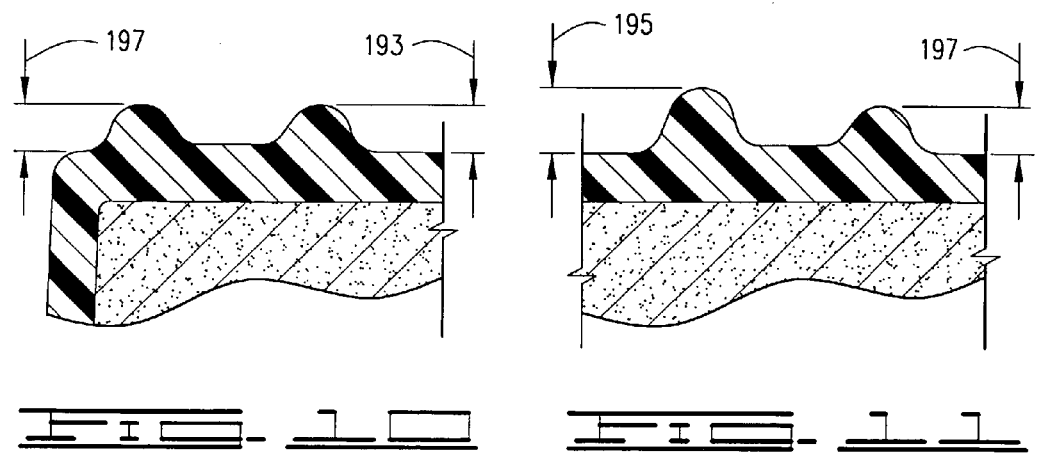
FIG. 10 is a view from line 10—10 of FIG. 9.
FIG. 11 is a view from line 11—11 of FIG. 9.
Figure 12:
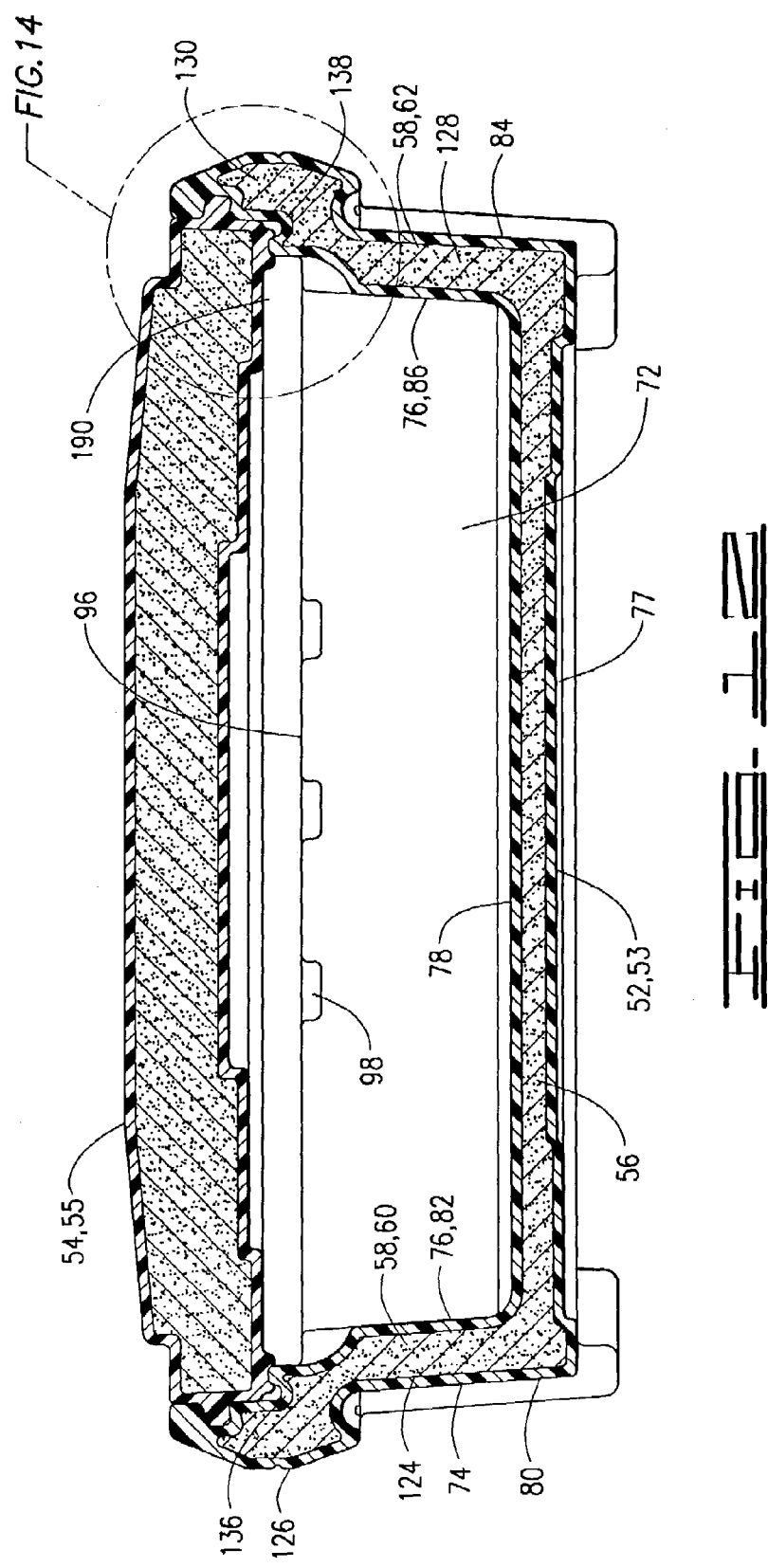
FIG. 12 is a view from line 12—12 of FIG. 7.
Figure 13:
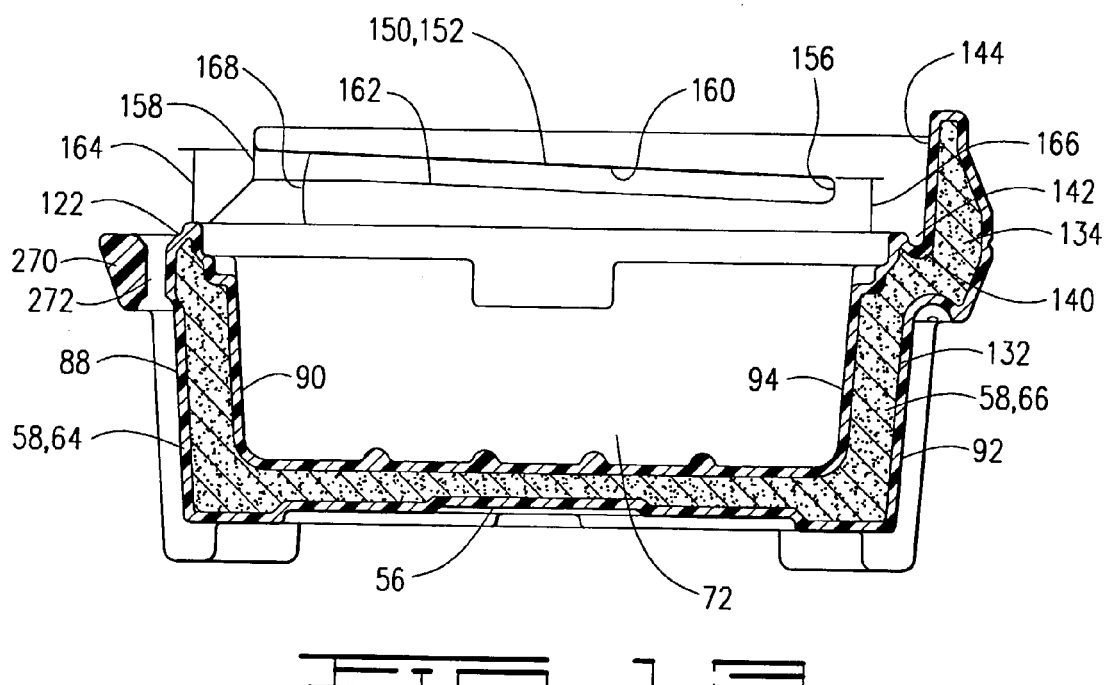
FIG. 13 is a view from line 13—13 of FIG. 8.

Lower wall portions 124, 128 and 132 have upper ends 136, 138 and 140, respectively. Upper ends 136, 138 and 140 collectively define groove 142 that is disposed outwardly from sealing lip 110. Groove 142 is defined between sealing lip 110 and upper wall portions 126, 130 and 134. Thus, upper wall portion 126 projects outwardly and upwardly from lower wall portion 124. Likewise, upper wall portions 130 and 134 project outwardly and upwardly from lower wall portions 128 and 132, respectively. Upper wall portion 134 of rear wall 66 has an inner surface 144 that is preferably a flat, generally vertical surface 144. Upper portions 126, 130 and 134 may be referred to as peripheral or marginal walls and thus may be referred to as left marginal wall 126, right marginal wall 130 and rear marginal wall 134. Left, right and rear marginal walls 126, 130 and 134 collectively comprise a door frame or lid frame 148. Left and right side walls 60 and 62 have a pair of grooves 150, which may be referred to as closure grooves 150 defined on the inner side or inner surface 82 and 86, respectively. Grooves 150 comprise a left side closure groove or first closure groove 152 defined in left side wall 60 and a right side closure groove or second closure groove 154 defined in right side wall 62. Left and right side grooves 152 and 154 are preferably parallel to one another. The same reference numerals will be used to identify the features of left and right side grooves 152 and 154 which as set forth above will be referred to herein collectively as grooves 150. Grooves 150 have a rear end 156 and a forward end 158. Rear and forward ends 156 and 158 may be referred to as first and second ends 156 and 158, respectively. Grooves 150 have upper surface 160 and lower surface 162. Upper surface 160 preferably is a sloped surface. Preferably, upper surfaces 160 slope downwardly to define an angle 163 from a horizontal line 165 as shown in FIG. 11. Angle 163 is preferably between approximately 8° and 14° and more preferably about 11°. Although the embodiment shown has a sloped upper surface, it is not necessary that surfaces 160 be sloped.

Grooves 150 are preferably sloped or angled grooves that slope from the forward end 158 to the rear end 156 thereof. Grooves 150 slope downwardly, in a direction toward sealing lip 110, from the forward ends 158 to the rear ends 156 thereof. The grooves 150 are therefore spaced upwardly a distance 164 at the forward end 158 thereof from surface 118 of sealing lip 110 and thus from plane 120. Grooves 150 are spaced upwardly at a distance 166 from sealing surface 118 of sealing lip 110 and thus from plane 120 at the rear ends 156 thereof. Distance 166 is smaller than distance 164 so that grooves 150 slope downwardly from the forward ends 158 to the rear ends 156 thereof. Grooves 150 slope downwardly toward sealing surface 118, and thus plane 120 to define an angle 168. Preferably, angle 168 is between 1° and 3° and more preferably is approximately 2°. At an angle of 2°, grooves 150 will slope downwardly toward sealing lip 110 approximately 0.035 inches per inch of travel. Left and right marginal side walls 126 and 130 have forward ends 170 and 172, respectively.

Figure 9:
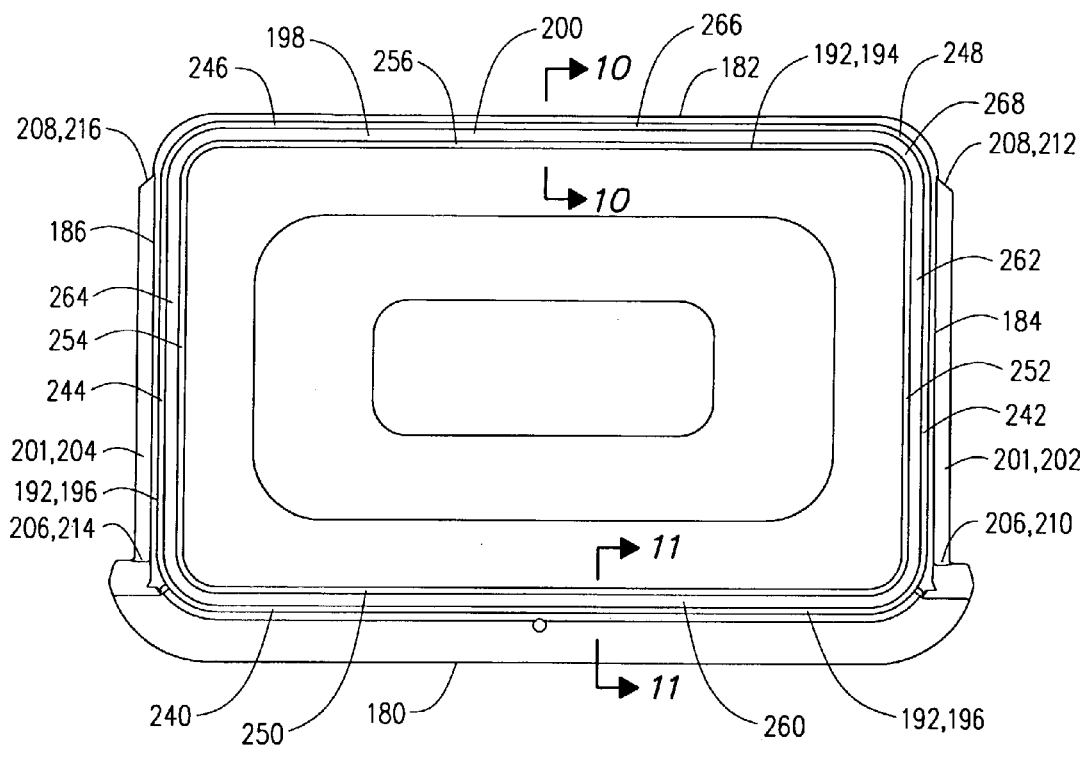
FIG. 9 is a view of the inner side, or under side of a food pan lid of the present invention.
Figure 15:
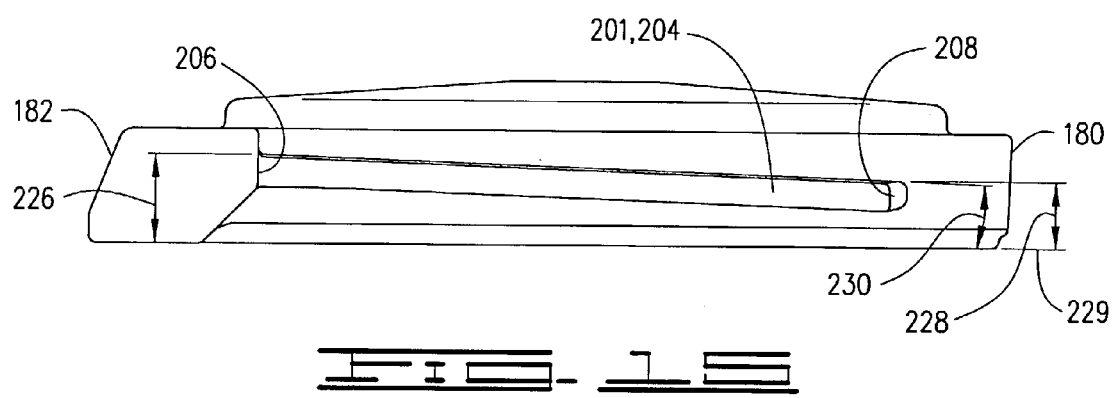
FIG. 15 is a side view of a food pan carrier lid of the present invention.
Figure 16:
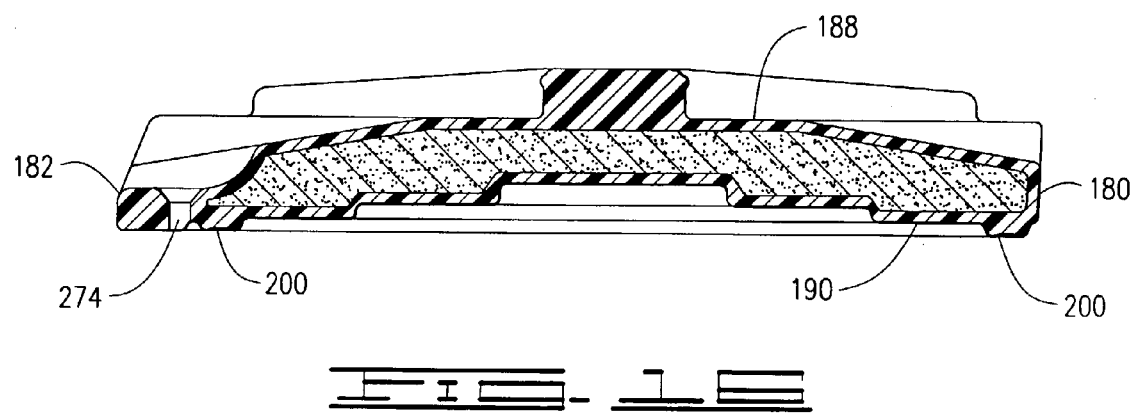
FIG. 16 is a cross-sectional view of the lid of the present invention.

Referring now to FIG. 9, a view of the under side or inner side of door, or lid 54 is shown. FIG. 15 shows a right side view of door 54. Door 54 has rear end 180, forward end 182, left side 184 and right side 186. Door 54 has an upper or outer side 188 and an inner or under side 190, which may be referred to as a lower surface 190. Door 54, and more particularly inner side 190, will engage pan carrier body 52, and preferably will engage sealing lip 110, which may be referred to as a seal bead 110, to provide a seal so that the desired temperatures and times set forth herein may be maintained. Inner side 190 comprises a pair of parallel seal beads 192 which may comprise an inner or first seal bead 194 and an outer or second seal bead 196. Inner and outer seal beads 194 and 196 are continuous, uninterrupted beads and thus comprise generally rectangular shapes with rounded corners. Inner seal bead 194 has a first height 193 and a second height 195. Outer seal bead 196 has height 197 that is preferably substantially the same as height 193, and is preferably constant. Beads 194 and 196 are spaced apart a distance 198. A sealing surface or sealing channel 200 is defined by and extends between inner and outer seal beads 194 and 196, respectively, and may be referred to as a door sealing surface 200.

Figure 14:
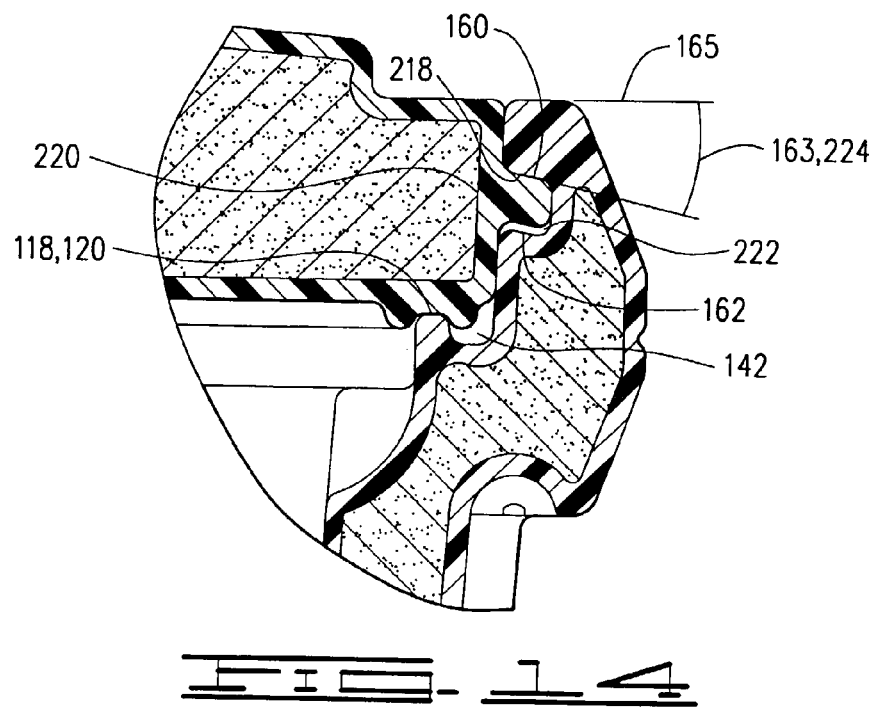
FIG. 14 is a partial cross-sectional view that shows the engagement of the door and pan carrier body of the present invention.

Door 54 includes a pair of side rails 201 at the sides 184 and 186 thereof and thus includes a left side rail or first rail 202 and a right side rail or second rail 204. Side rails 201 are adapted to be received in grooves 150. More specifically, left side rail 202 is adapted to be received in left side groove 152 and right side rail 204 is adapted to be received in right side groove 154. Side rails 201 have forward ends 206 and rear ends 208. Rear ends 208 may be referred to as first ends 208 and forward ends 206 may be referred to as second ends 206. The forward end 206 of left side rail 202 may be referred to as a forward end 210 and the rear end thereof may be referred to as a rear end 212. The forward end 206 of right side rail 204 may be referred to as the forward end 214 and the rear end thereof may be referred to as a rear end 216. Rails 201 have upper surface 218 and lower surface 220. As shown in FIG. 14, when upper surface 218 of rails 201 engage upper surface 160 of grooves 150, there will be a gap 222 between the lower surface 220 of rail 201 and the lower surface 162 of grooves 150. Upper surface 218 is preferably sloped so that it will mate with upper surface 160, and thus defines an angle 224 from the horizontal that is preferably 8 to 13° and is more preferably about 11°.

Rails 201 slope downwardly from the forward ends 206 to the rear ends 208 thereof, and thus slope towards the door sealing surface 200. Upper surface 218 is thus spaced upwardly a distance 226 from lower surface 162 at the forward end 206 of side rails 201. Side rails 201 are spaced upwardly from lower surface 162 a distance 228 at the rear ends 208 thereof. Space, or distance 226 has a magnitude greater than space or distance 228. Side rails 201 slope downwardly preferably at an angle 230 from a plane defined by sealing surface 200 and represented by the line 229 in FIG. 15. and thus slope from the second ends 206 to the first ends 208 toward sealing surface 200. Angle 230 is preferably approximately 1° to 3° and more preferably approximately 2° which yields a slope of approximately 0.035 inches per inch for travel.

Figure 8:
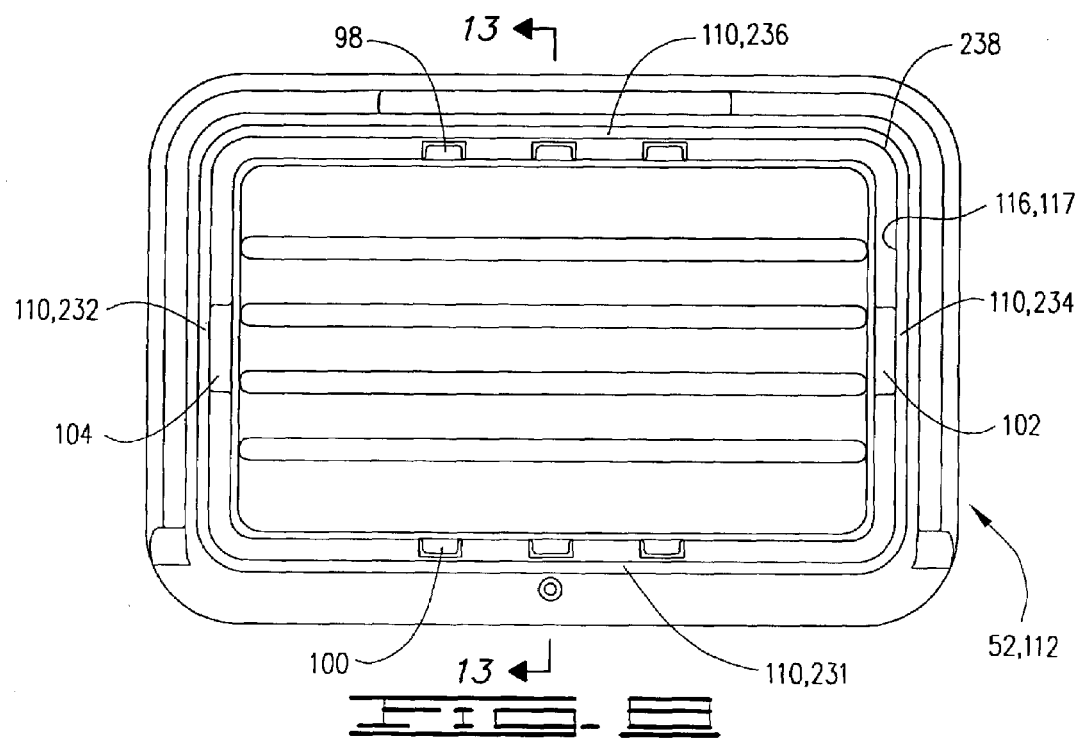
FIG. 8 is a top view of the food pan carrier of the present invention with the lid removed.

Referring now back to FIG. 8, sealing lip, or seal bead 110 is generally rectangularly shaped with rounded corners and thus has a front, or forward portion 231, left and right side portions 232 and 234 and rear portion 236 all connected by rounded corners 238. Front portion 250 of inner seal bead 194 has second height 195, and the remainder of inner seal bead 194 has height 193. Height 195 is preferably slightly greater than height 193. Outer seal bead 196 on door 54 has a front, or forward portion 240, left and right portions 242 and 244 and a rear portion 246 all joined by rounded corners 248. Inner seal bead 194 has a forward portion 250, left and right portions 252 and 254, respectively, rear portion 256 and rounded corners 258. Sealing surface 200 is thus generally rectangularly shaped and has a front portion 260, left and right portions 262 and 264, respectively, rear portion 266 and rounded corners 268.

FIG. 8 shows a top view of a food pan carrier with door 54 removed and in open position 112. When door 54 is open, or completely removed and disengaged from pan carrier body 52, food pans and/or divider bars (not shown) of a type known in the art may be placed in or removed from pan carrier body 52. To close food pan carrier 50, door 54 is positioned so that rails 201 will engage grooves 150. Rear ends 212 and 216 of left and right side rails 202 and 204, respectively, may be placed in the forward ends 158 of left and right side grooves 152 and 154. Door 54 is moved toward the rear wall 66 of pan carrier body 52. Lower surface 190 of door 54, and more specifically sealing surface 200 is spaced upwardly from seal bead 110 when rails 201 are initially engaged with grooves 150. As door 54 is moved rearwardly, the slope of rails 201 and grooves 150 will cause door 54 to move closer to sealing lip 110. Door 54 will begin to engage the sealing lip 110 prior to the time ends 212 and 216 of rails 202 and 204 engage rear ends 156 of left and right side grooves 152 and 154. For example, door 54 may begin to engage sealing lip 110 when the door is positioned such that rear portion 266 of sealing surface 200 is 0.50 inch to 1.50 inch forward of rear portion 236 of sealing lip 110. When door 54 begins to engage sealing lip 110, upper surface 218 of rail 201 will engage upper surface 160 of grooves 150 so that continued movement of the door toward the rear of pan carrier body 52 will cause greater engagement and an interference-type fit. To fully close door 54, the door is continued to be moved rearwardly until rear portion 246 of seal bead 196 engages and is moved over rear portion 236 of sealing lip 110. At the same time, front or forward portion 250 of inner seal bead 194 will engage and be forced over forward portion 231 of sealing lip 110. When fully closed, sealing surface 200 will preferably be in intimate contact with sealing lip 110 around the entire periphery thereof. It is possible, due to the nature of plastics, that slight gaps will exist. However, because of the interference-type fit, intimate contact will be achieved preferably around the entire periphery of the sealing surface 200 and over at least a significant portion thereof so that a sufficient seal exists to prevent the escape of steam and a sufficient seal exists to maintain food originally heated to a temperature of 185° F. at a temperature of 141° F. or higher for a minimum amount of time of about six hours. Food pan containers of the present configuration will maintain such food at a temperature of 141° F. for in excess of six hours and up to thirteen hours. Food pan carrier 50 thus comprises a food pan carrier of two-piece working construction. Two-piece working construction simply means that the food pan carrier 50 is of a construction such that it comprises a pan carrier body 52 and a food pan door or food pan lid 54 that require no additional hinges, latches, handles, gaskets or other parts to create a sufficient seal to hold food at the desired temperatures for the desired amount of time. The two-piece construction is thus a gasketless construction that provides the desired insulating characteristics.

Pan carrier body 52 may define a flange 270 projecting outwardly at the upper end of forward wall 64. Flange 270 may project forwardly and may have a locking hole 272 defined therethrough. Locking hole 272 is positioned to mate with a locking hole 274 positioned near the forward end 182 of door 54. If desired, a lock or other mechanism may be inserted through locking holes 272 and 274 when door 54 is in its closed position to prevent inadvertent opening and to make certain that door 54 remains fully closed when food is stored therein.

Figure 17:
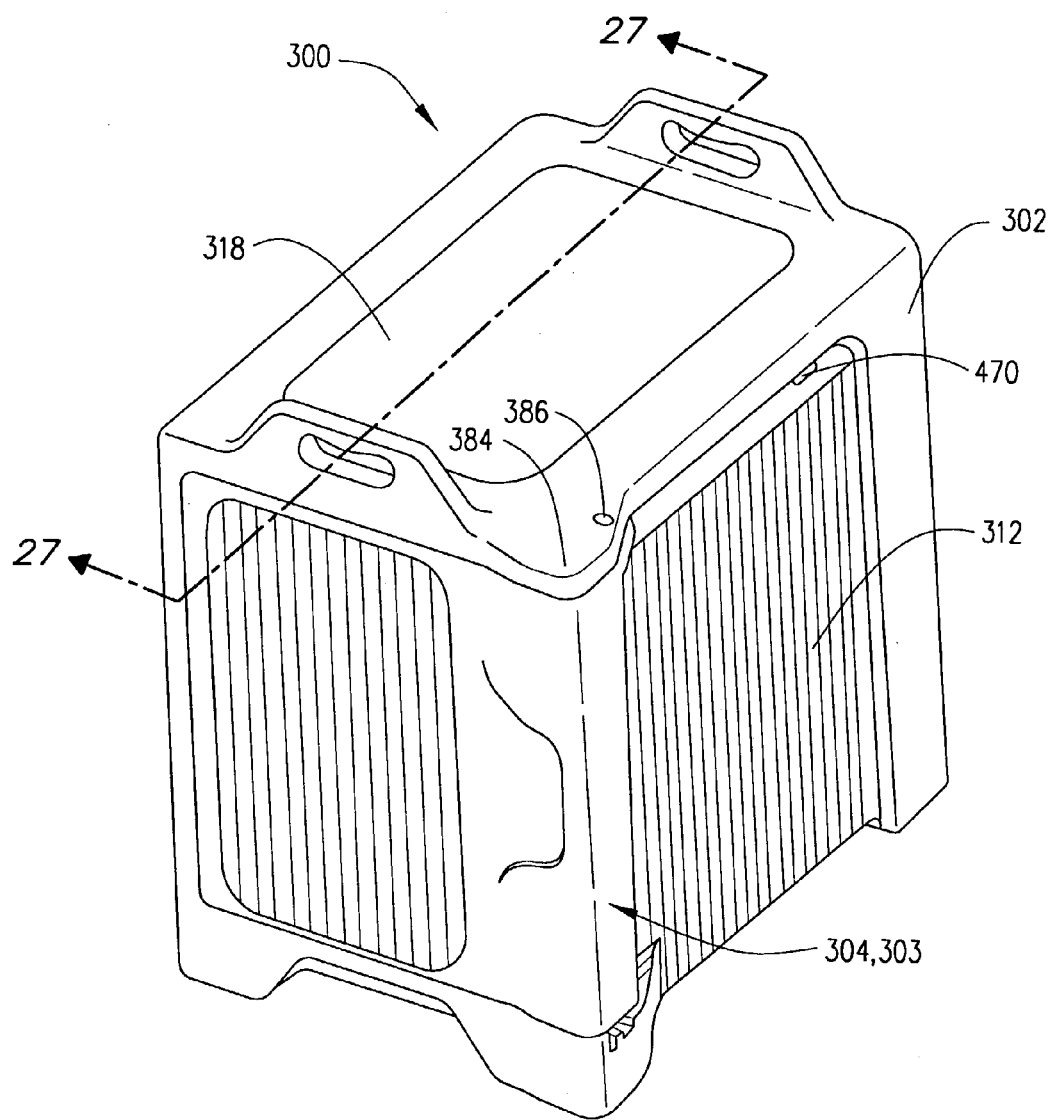
FIG. 17 is a perspective view of an additional embodiment of a food pan carrier of the present invention showing the front and right sides thereof.
Figure 18:
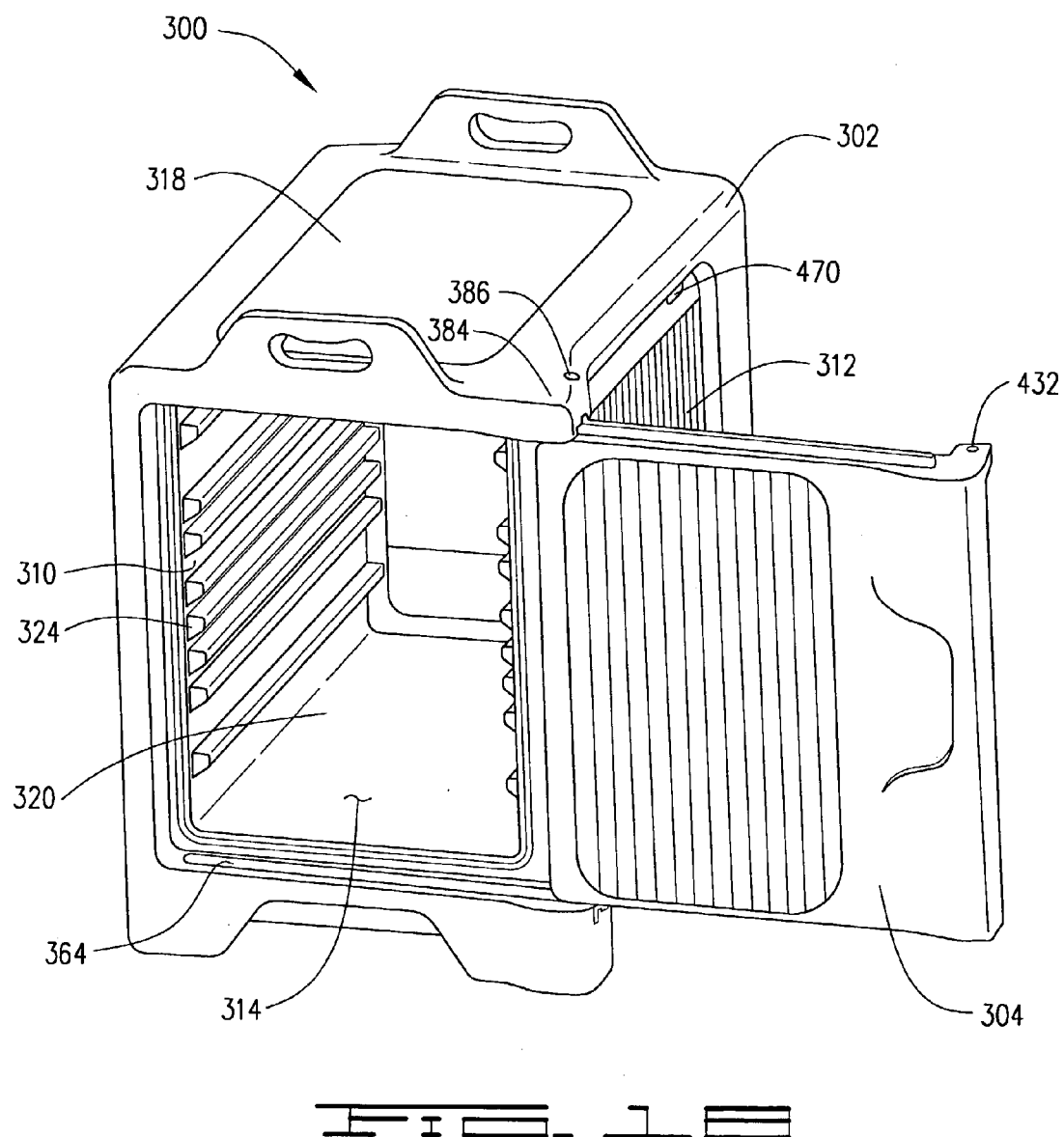
FIG. 18 is a perspective view of the food pan carrier of FIG. 17 with the food pan door open.
Figure 19:
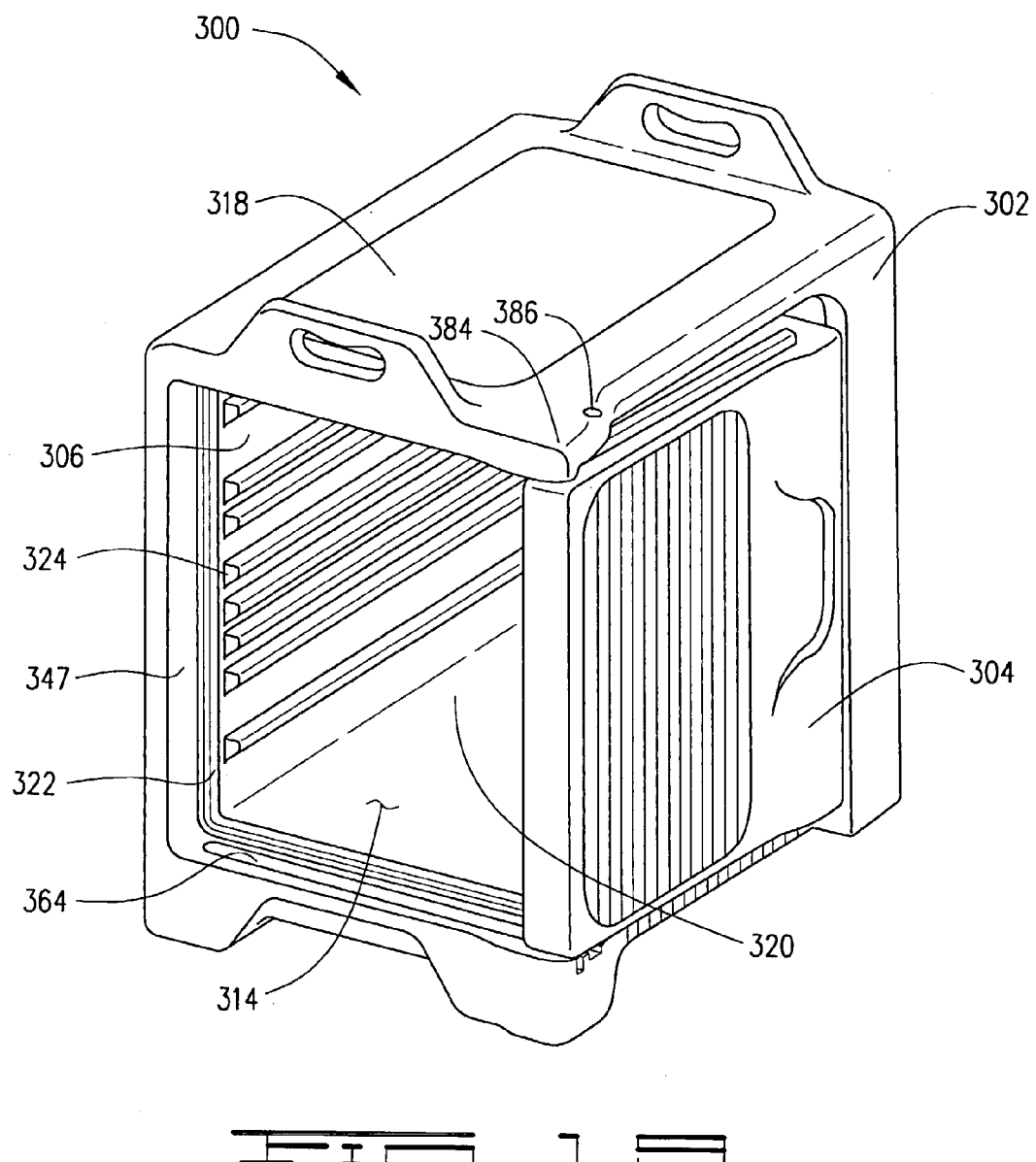
FIG. 19 is a perspective view of the food pan carrier of FIG. 17 showing the door of the food pan carrier in a stowed position.
Figure 20:
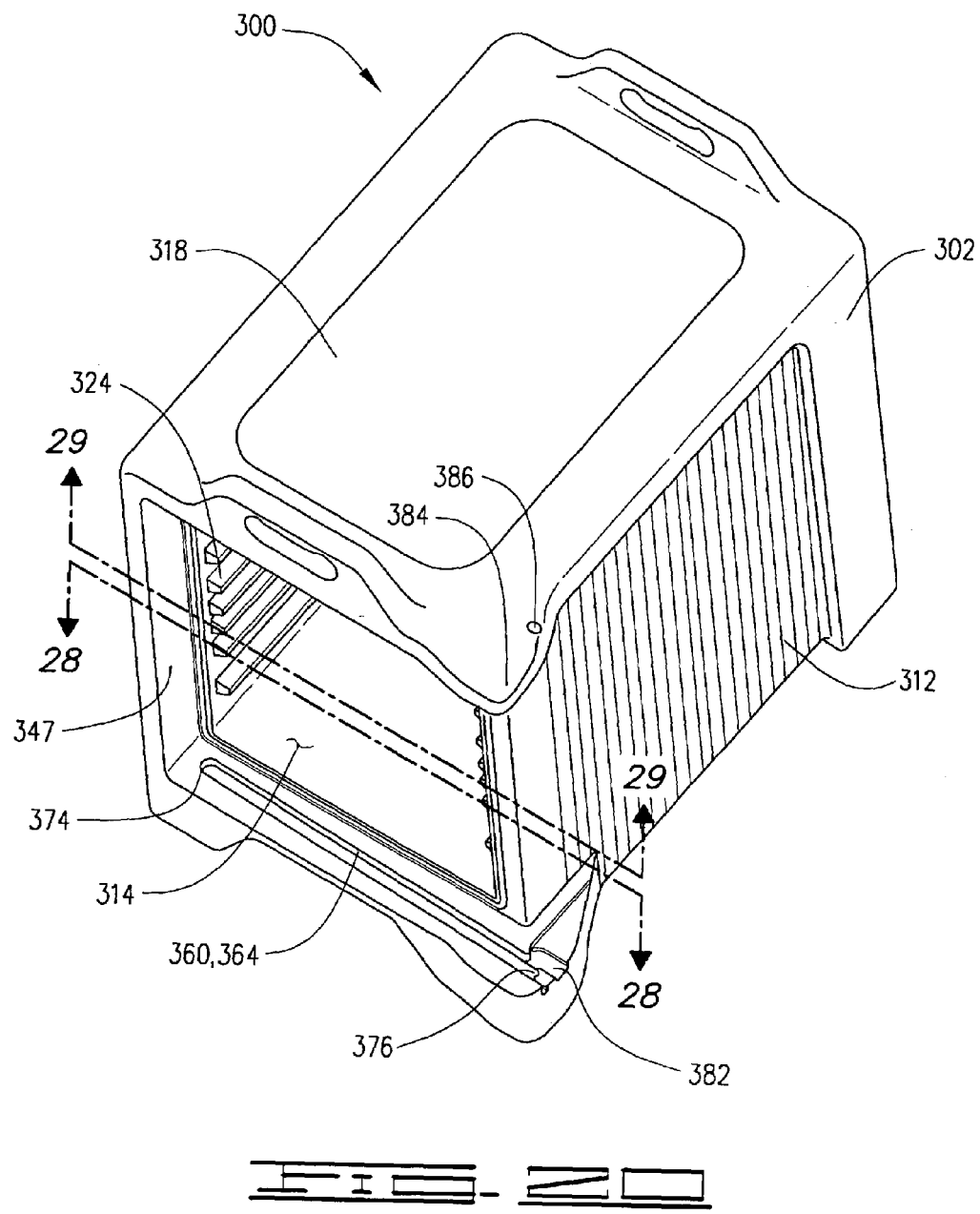
FIG. 20 is a perspective view showing the lower closure groove on the food pan carrier.
Figure 21:
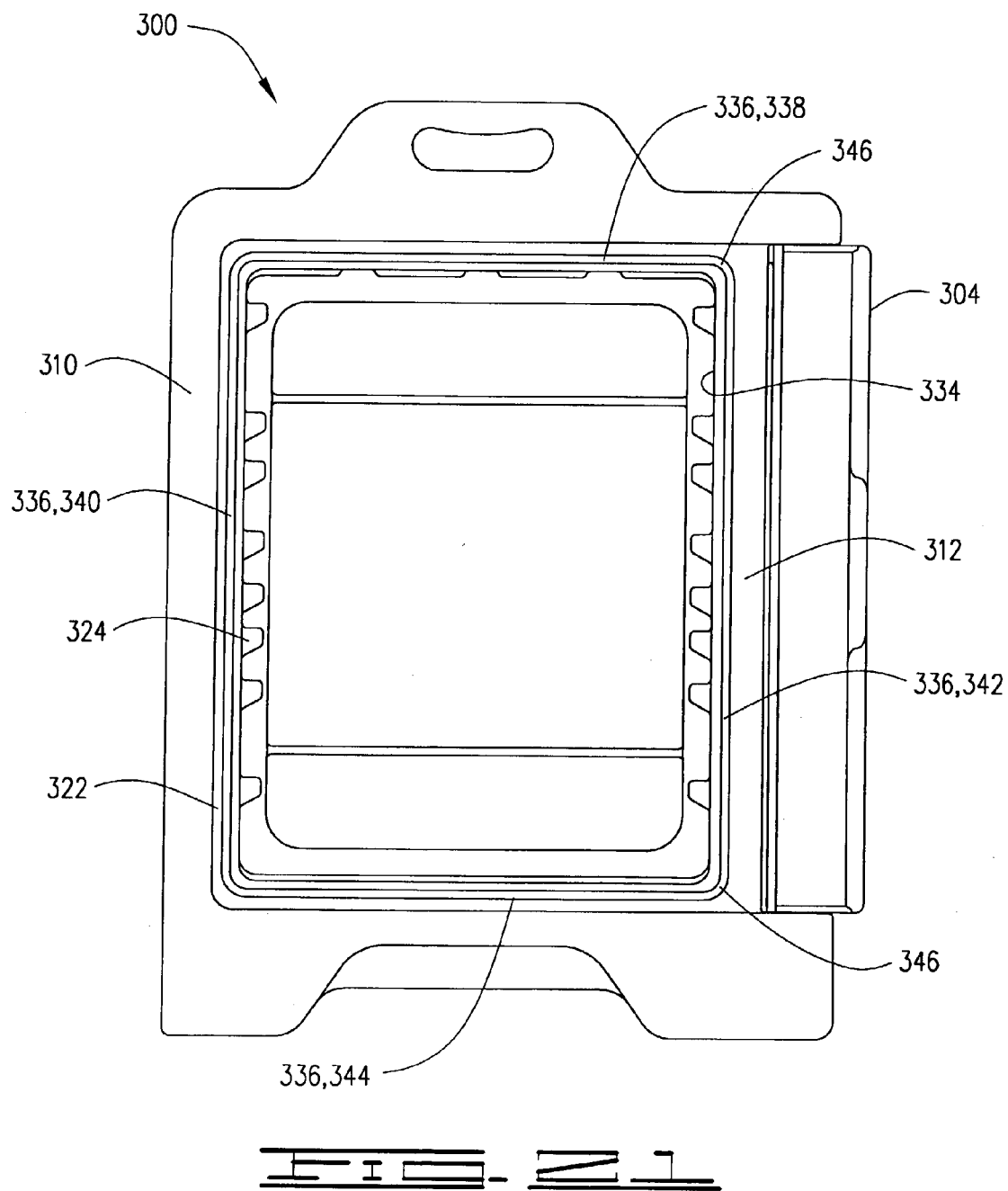
FIG. 21 is a view from the front of the food pan carrier of the present invention with the door in the stowed position.

Referring now to FIGS. 17–29, an additional embodiment of the food pan carrier of the present invention is shown and described and is designated by the numeral 300. Food pan carrier 300 may be generally referred to as an end loader 300. End loader 300 comprises a pan carrier body 302 which may be referred to as a food pan receptacle 302 and a food pan door 304. Food pan door 304 is movable between and open position 303 wherein food pans may be placed in or removed from pan carrier body 302 and a closed position 305 in which food pan door 304 sealing engages pan carrier body 302 sufficiently such that food placed in pan carrier body 302 that is heated originally to at least a temperature of 185° F. will maintain a temperature of 141° or above for a desired amount of time, preferably at least six hours. The embodiment of FIG. 17 has been shown to maintain food heated to 185° F. at 141° F. or greater for as much as twelve to fifteen hours. Pan carrier body 302, like pan carrier body 52 may be comprised of a plastic shell, for example polyethylene, and may be filled with an insulating foam, such as for example, the two-part expandable foam set forth hereinabove. The pan carrier body is comprised of an inner shell 306 and an outer shell 308 with a space therebetween filled with the insulating material such as the insulating foam set forth herein. Pan carrier body 302 comprises a first or left side wall 310 and a second or right side wall 312 projecting upwardly from a bottom wall 314. A rear wall 316 likewise projects upwardly from bottom wall 314 and is connected to side walls 310 and 312.

A top wall 318 is connected to an upper end of rear wall 316 and left and right side walls 310 and 312, respectively. Left and right side walls 310 and 312, top and bottom walls 318 and 314 and rear wall 316 define a food pan or food-receiving cavity 320 having a forward face 322. Food-receiving cavity 320 may have shelves spaced at any desired distance and having desired length to hold food pans as is known in the art. Food-receiving cavity 320 which may be referred to as food pan receptacle 320, is defined by inner surfaces 326, 328, 330, 331 and 332 of bottom wall 314, left side wall 310, right side wall 312, rear wall 316 and top wall 318, respectively. Forward face 322 or door face 322 defines a generally rectangular door opening 334 or doorway 334 at the forward end of food-receiving cavity 320, through which food pans can be inserted and removed. Opening 334 is a generally rectangular opening with rounded corners.

A seal bead 336 is defined on forward face 322 and projects outwardly therefrom. Seal bead 336 defines a generally rectangularly shaped seal bead with rounded corners and circumscribes opening 334. Seal bead 336 defines a surface 337, which may be referred to as a body sealing surface 337. Seal bead 336 has upper portion 338, left side portion 340, right side portion 342 and lower portion 344, all connected by rounded corners 346. Upper, or top wall 318, bottom wall 314 and left side wall 310 extend forward beyond forward face 322 to define a door frame 347. The portion of top wall 318 that projects forward of forward face 322 may be referred to as peripheral, or marginal top wall 348. Likewise, the portions of left side wall and bottom wall that extend forward of forward face 322 may be referred to as peripheral or marginal left side and bottom walls 350 and 352. Left marginal wall 350 has inner surface 354 that is preferably a planar surface.

Pan carrier body 302 includes a pair of closure grooves 360. Food pan door 304 is slidable in closure grooves 360 between its open and closed positions 303 and 305. Open position 303 is simply that position wherein food pan door 304 does not cover opening 334 so that food pans may be placed in and removed from pan carrier body 302. Thus, the door 304 is in the open position when it is completely removed from pan carrier body 302 or when door 304 is in the stowed position of the door, shown in FIGS. 19 and 21, in which the door is rotated so that it is still engaged with the pan carrier body 302 but is adjacent and may be generally parallel to right side wall 312.

Closure grooves 360 include a first or upper closure groove 362 and a second or lower closure groove 364. Upper closure groove 362 has a first or left end 366 and a second, or right end 368. Upper closure groove 362 slopes from the second end 368 to the first end 366 thereof towards forward face 322, and thus towards seal bead 336. Upper closure groove 362 slopes to define an angle 371 with a plane represented by line 372 in FIG. 29. Plane 372 is coplanar with body sealing surface 337 so that upper closure groove 362 is sloped or angled inwardly from the second end 368 thereof to the first end 366 thereof at an angle 371 toward seal bead 336 and body sealing surface 337. Angle 371 is preferably 1° to 3° and is more preferably 2°. At a 2° angle, the closure groove 362 will slope towards door sealing surface 337 approximately 0.035 inches per inch of travel.

Lower closure groove 364 has first or left end 374 and second or right end 376. Lower closure groove 364 is parallel to upper closure groove 362 and thus slopes from the second end 376 to the first end 374 thereof towards seal bead 336 and body sealing surface 337. Lower closure groove 364 slopes toward seal bead 336, and body sealing surface 337 at an angle 380 which is preferably 1° to 3° and more preferably 2°. At a 2° angle, lower closure groove 364 will slope toward seal bead 336 approximately 0.35 inches per inch of travel. A release groove 382 is connected with lower closure groove 364 to allow door 304 to be removed as will be explained in more detail hereinbelow. Pan carrier body 302 has an upper ear 384 that projects from right side wall 312. Upper ear 384 has a hole or opening 386 defined therethrough which, as will be explained hereinbelow will mate with an opening in door 304.

Figure 22:
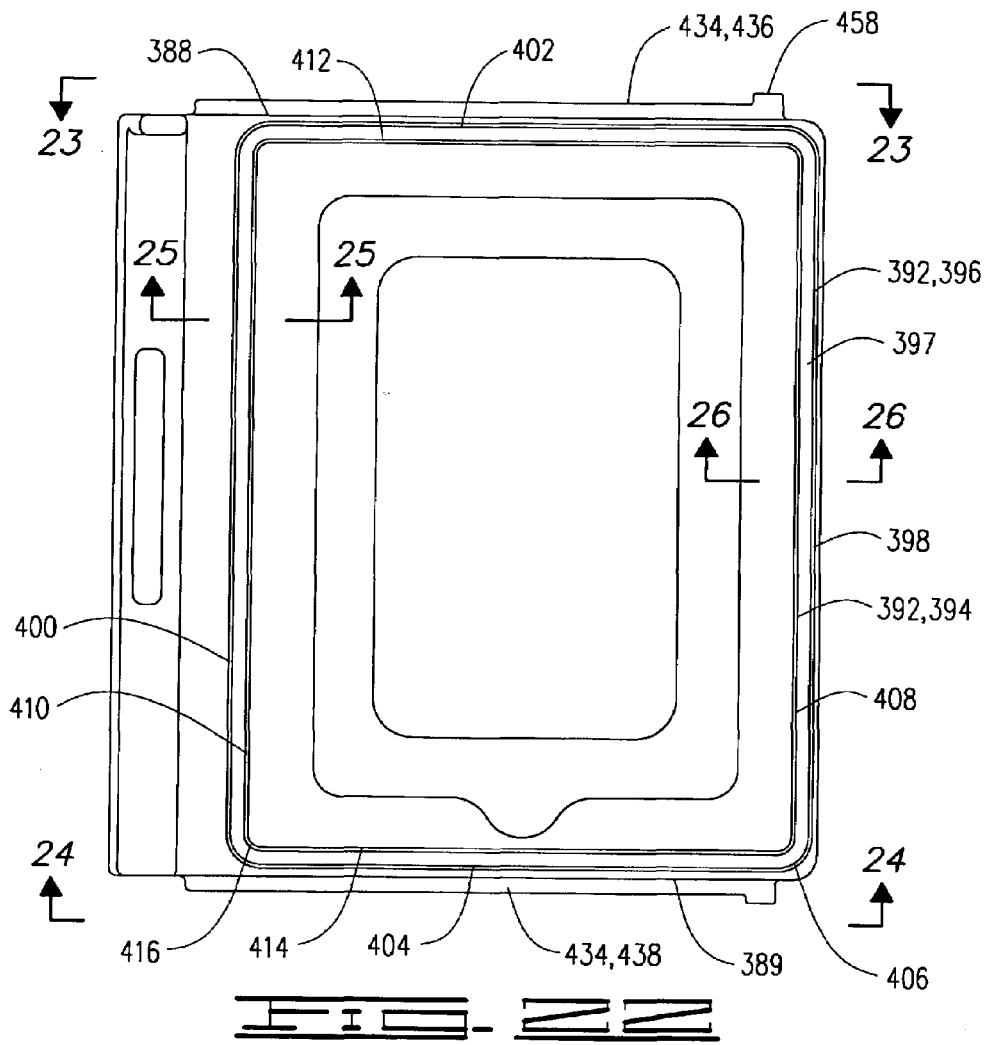
FIG. 22 shows the inner side of the food pan door of the embodiment of FIG. 17.

Door 304 has a top side, or top edge 388, a bottom side, or bottom edge 389 and an inner surface or inner side 390. Referring now to FIG. 22, a view of the inside 390 or inner surface 390 of door 304 is shown. Inner surface 390 has a pair of seal beads 392 thereon comprising an inner, or first seal bead 394 and an outer, or second seal bead 396. Seal beads 394 and 396 are preferably parallel to one another and define generally rectangular seal beads. Inner seal bead 394 and outer seal bead 396 define a sealing channel 395 therebetween having a sealing surface 397, which may be referred to as door sealing surface 397. Outer seal bead 396 has a left side portion 398, a right side portion 400, an upper portion 402 and a lower portion 404 all connected by rounded corners 406. Inner seal bead 394 has a left side portion 408, a right side portion 410, an upper portion 412, a lower portion 414, all connected by rounded corners 416. Seal bead 396 has a height 418 that is preferably consistent around the entire periphery thereof. Left side portion 408, top portion 412 and bottom portion 414 of inner seal bead 394 have a height 420 that is preferably substantially the same as height 418. Right side portion 410 of inner seal bead 394 has a height 422 that is slightly greater than heights 418 and 420.

Figure 23:
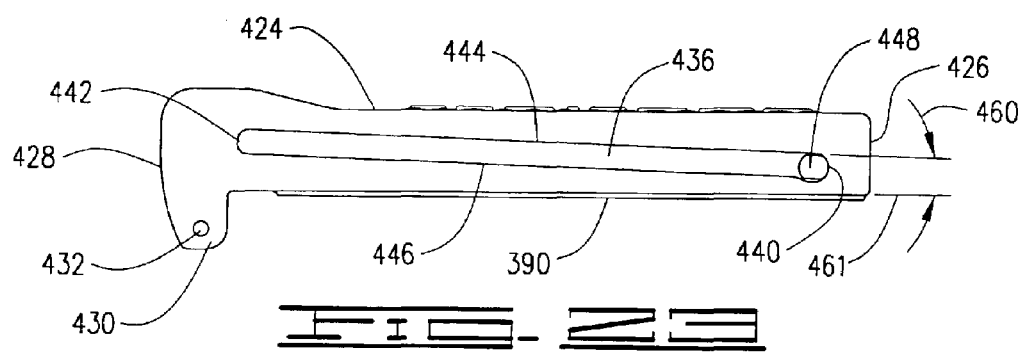
FIG. 23 is a view from line 23—23 of FIG. 22.

A top view of food pan door 304 is shown in FIG. 23. Door 304 has an outer surface or outside 424 and inner surface or inner side 390. Door 304 also has first, or left side 426 and second, or right side 428. Left and right sides 426 and 428 may be referred to as left and right edges 426 and 428. Door 304 has an ear 430 projecting inwardly from inner side 390 at the left side 426 thereof. Ear 430, which may also be referred to as a locking tab 430 may have an opening 432 therethrough which in the closed position 305 of the door 304 will mate with opening 386. If desired, a pin, lock or other mechanism may be inserted through openings 432 and 386 to lock door 304 in the closed position.

Door 304 has rails 434 at the top and bottom sides 388 and 389 thereof and thus includes a top rail 436 and a bottom rail 438 adapted to be received and movable, or slidable in upper and lower closure grooves 362 and 364, respectively. Upper rail 436 has first or left end 440 and second or right end 442. Upper rail 436 has an outer side 444 and an inner side 446. A stop or hinge pin 448 projects upwardly from upper rail 436 at second end 442 thereof. Lower rail 438 has first or left end 450, second or right end 452, inner side 454 and outer side 456. A lower stop or lower hinge pin 458 projects downwardly from lower rail 438 at second end 452.

Both of upper and lower rails 436 and 438 are sloped or angled rails. Thus, the upper rail slopes from the second end 442 to the first end 440 thereof in a direction towards inner side 390 and thus toward sealing surface 200. Rail 436 slopes toward sealing surface 397 to define an angle 460 with a plane parallel to sealing surface 397 represented by line 461 in FIG. 23. Angle 460 is preferably about 1° to 3° and more preferably about 2°. At an angle of 2°, rail 436 will slope approximately 0.035 inches per inch.

Figure 24:
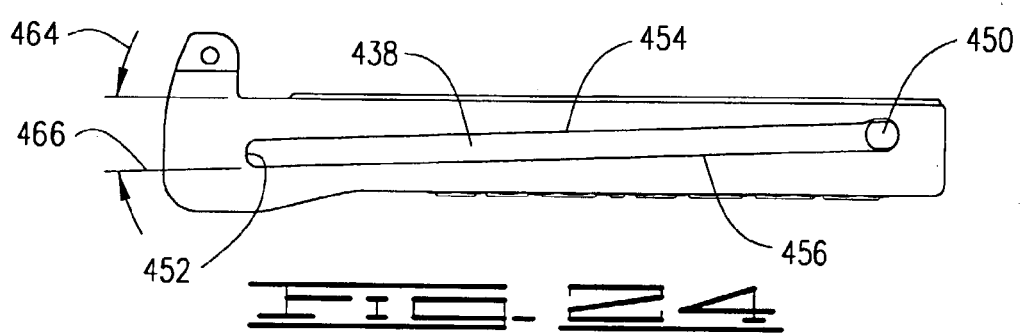
FIG. 24 is a view from line 24—24 of FIG. 22.
Figure 25:
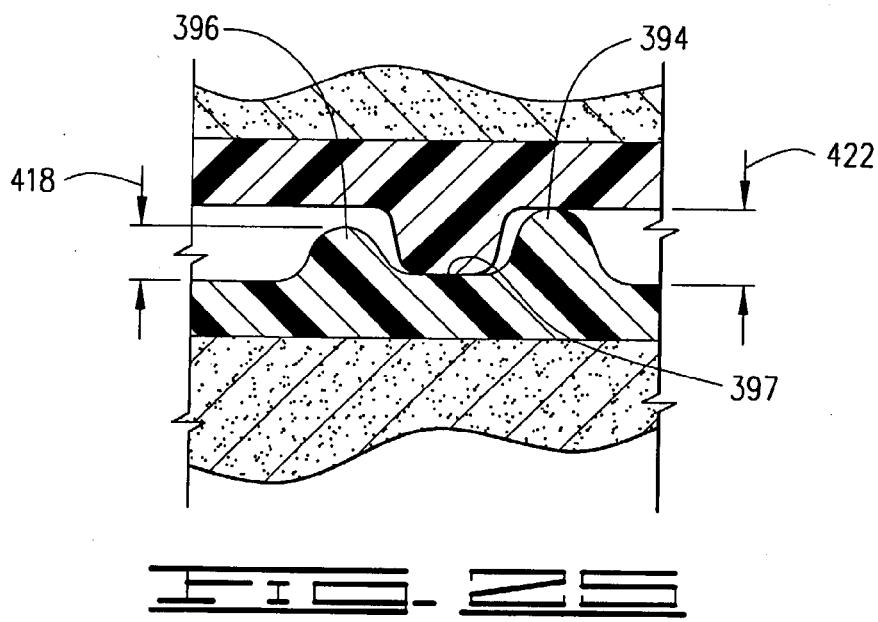
FIGS. 25 and 26 are cross-sections taken from lines 25—25 and 26—26, respectively, of FIG. 22.
Figure 26:
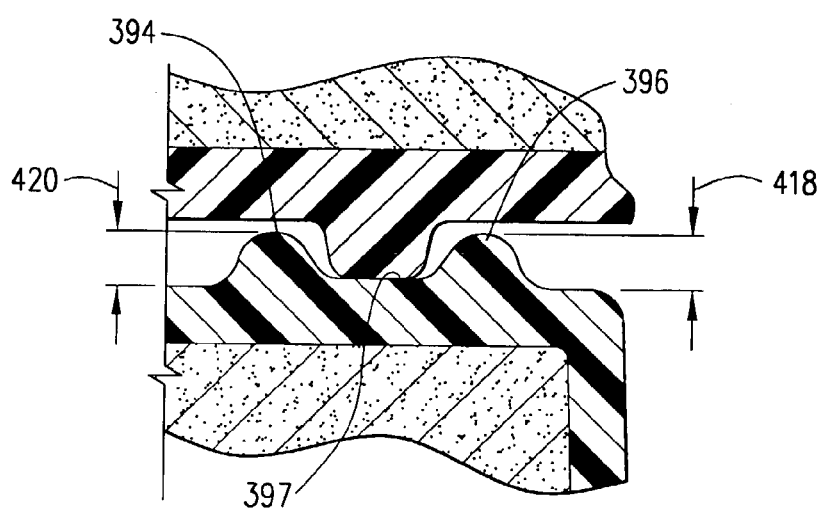
Figure 27:
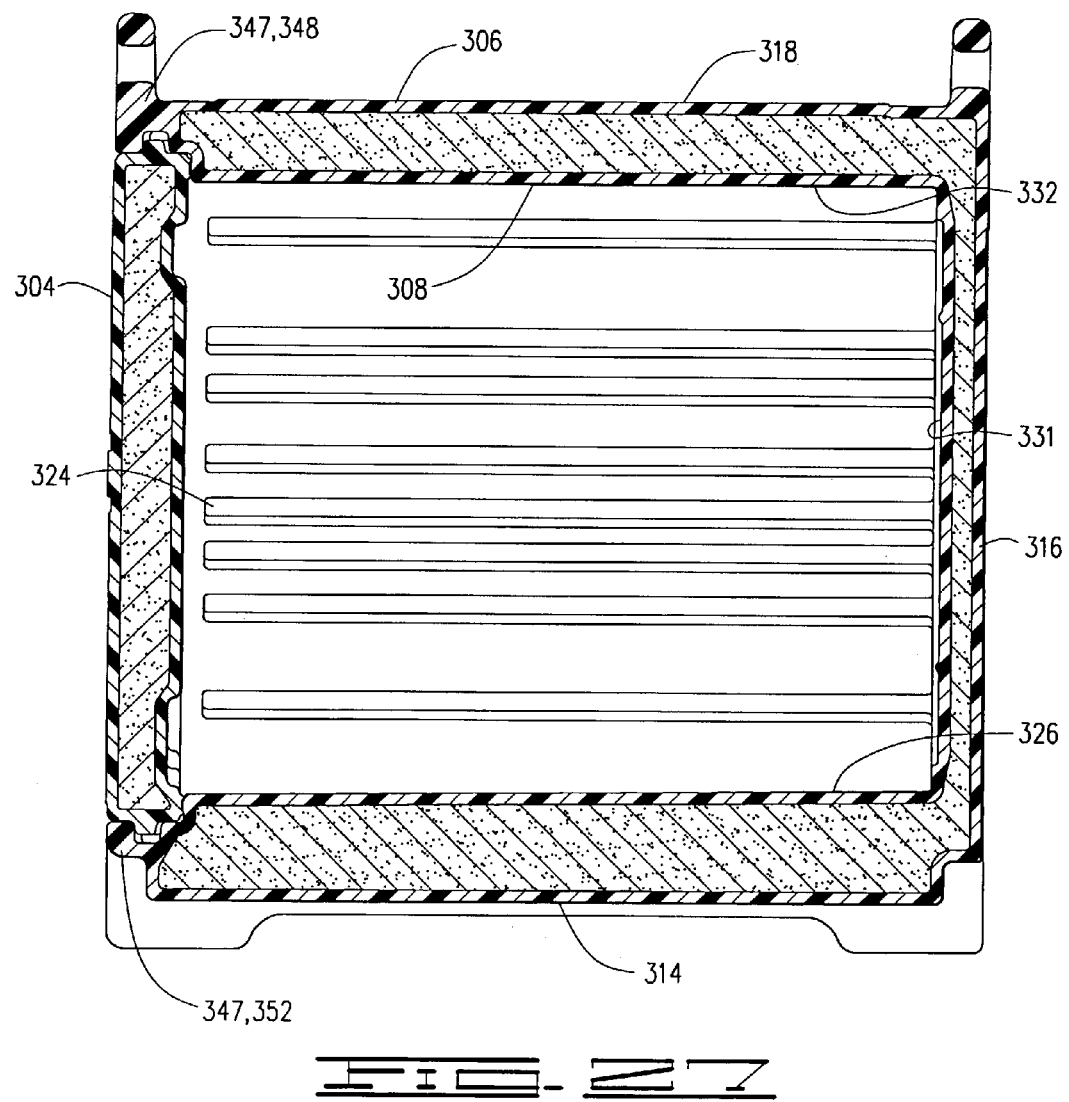
FIG. 27 is a cross-sectional view from line 27—27 of FIG. 17.
Figure 28:
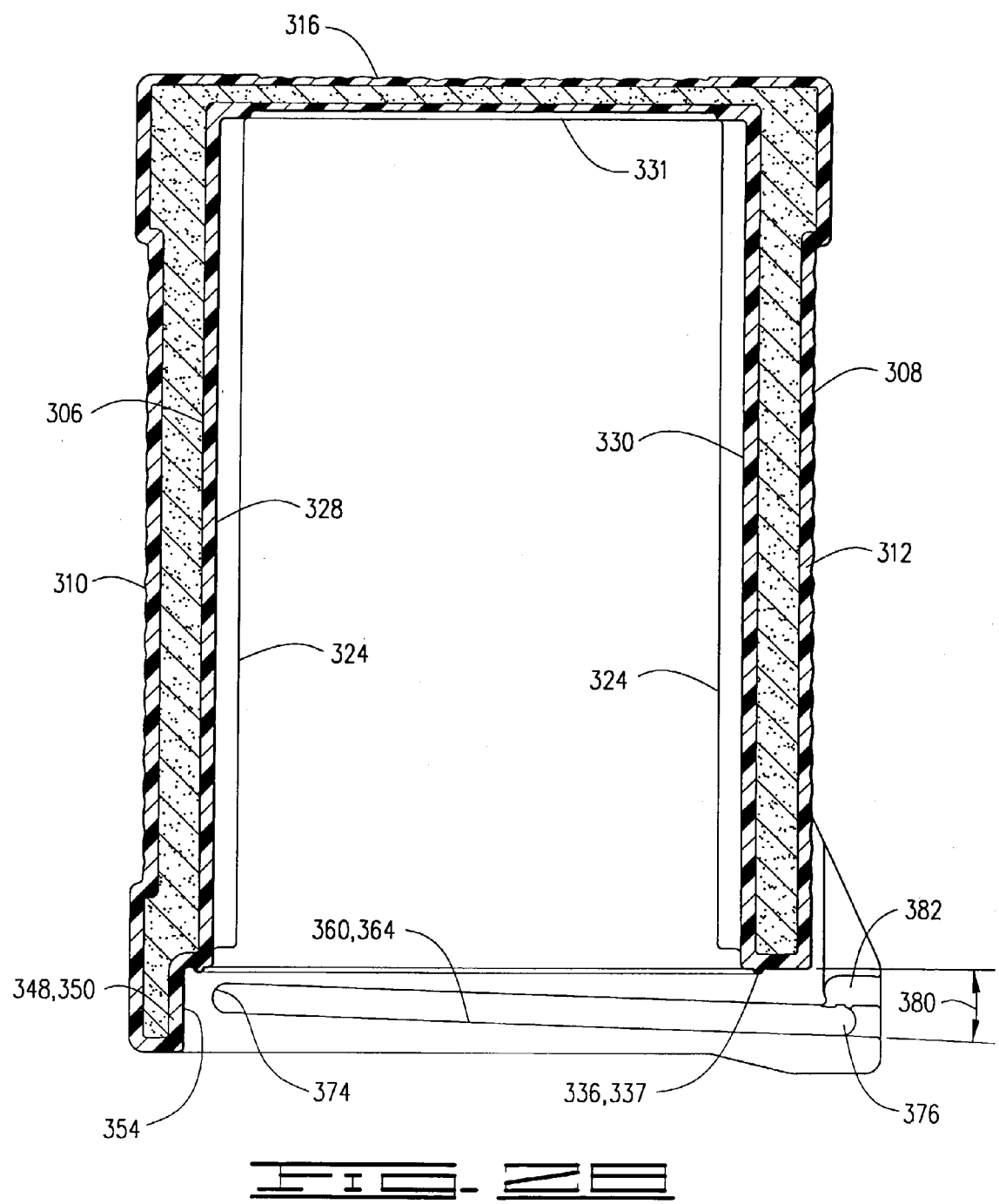
FIG. 28 is a view from line 28—28 of FIG. 20.
Figure 23:
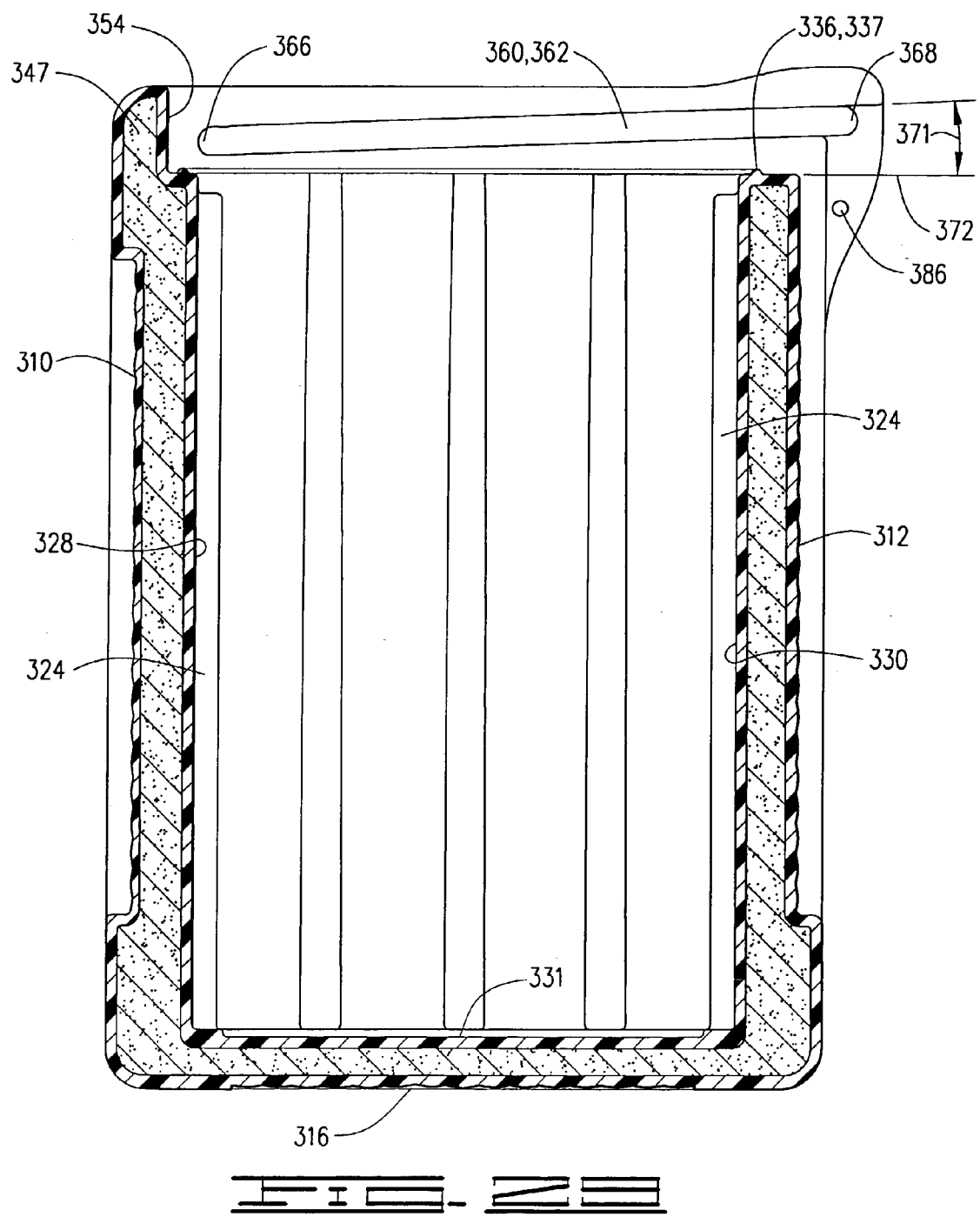
Figure 30:
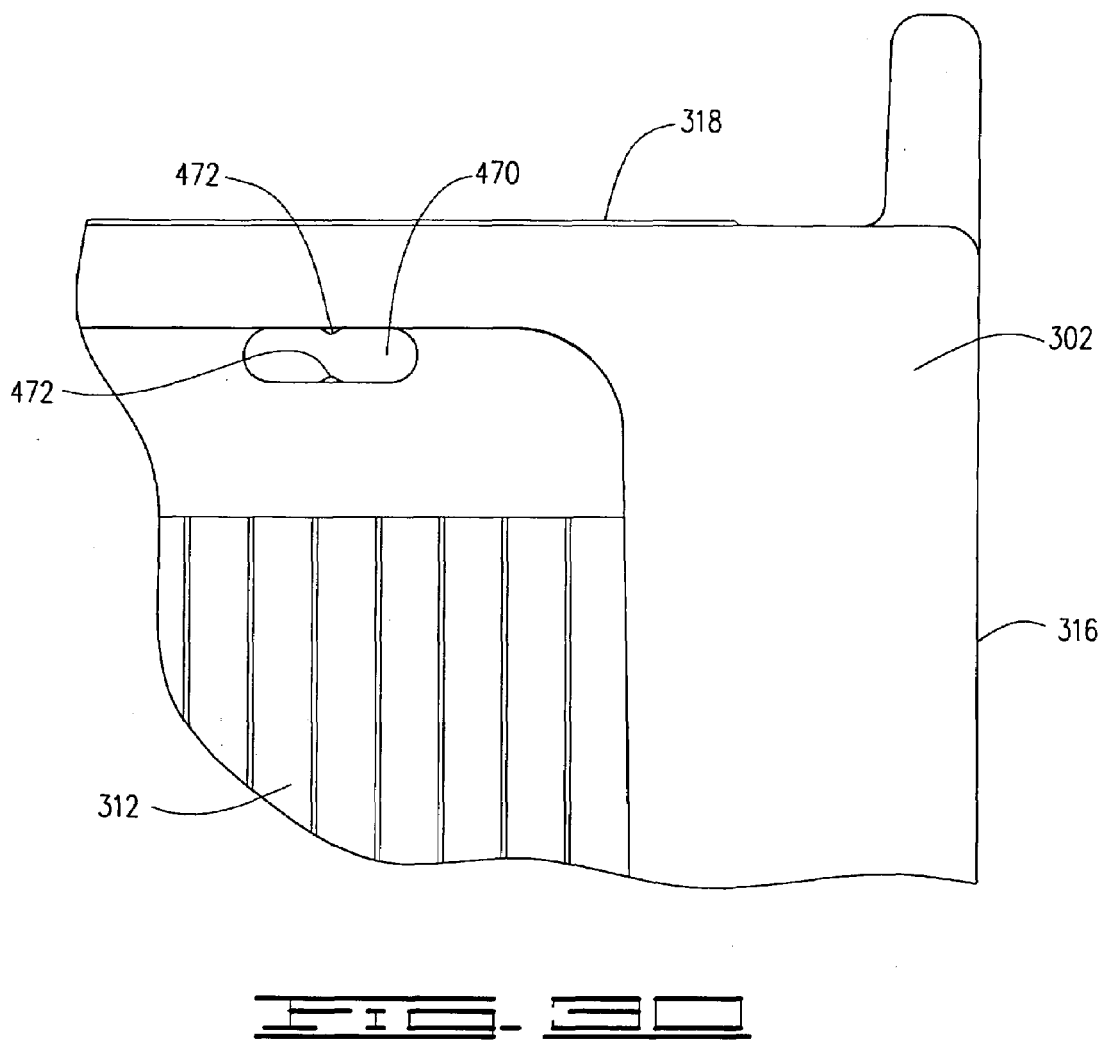
FIG. 30 is a view of the upper right rear corner of the food pan carrier.

Similarly, rail 438 thereof slopes toward a plane defined by sealing surface 397, represented in FIG. 24 by line 464 to define an angle 466. Angle 466 is preferably approximately 1° to 3° and more preferably is approximately 2°.

To close door 304, first ends of upper and lower rails 436 and 438, respectively, are placed in upper and lower closure grooves 362 and 364, respectively. Upper stop 448 is placed in upper closure groove 362, and lower stop 458 is moved into lower closure groove 364 through release groove 382. Door 304 is slidable in closure grooves 362 and 364 and is moved toward the closed position 305 shown in FIG. 17. Thus, first ends 440 and 450 of upper and lower rails 436 and 438 are moved toward first ends 366 and 374 of upper and lower closure grooves 362 and 364, respectively. Door 304 will begin to engage seal bead 336 prior to the time first ends 440 and 450 reach first ends 366 and 374 of upper and lower closure grooves 360 and 362, respectively. Door 304 will continue to be moved so that left side portion 398 of outer seal bead 396 moves over left side portion 340 of seal bead 336, and so that right side portion 410 of inner seal bead 394 moves over right side portion 342 of seal bead 336 on door 304. In the fUlly closed position, seal bead 336 will sealingly engage sealing surface 397. Continued movement toward the left side 310 will cause an interference-type fit. In the fully closed position, seal bead 336 on pan carrier body 302, and specifically door sealing surface 337 is in intimate contact with body sealing surface 397 between inner and outer seal beads 394 and 396 on food pan door 304. In the closed position, holes 386 and 432 are aligned so that locks, pins or other mechanisms may be inserted therethrough to prevent door 304 from being moved to the open position until the desired time. In the fully closed position, sealing engagement between the door 304 and pan carrier body 302, and more specifically between seal bead 336 and sealing surface 397 is such that food heated to a temperature of 185° F. will maintain a temperature of at least 141° F. for an extended period of time, and preferably for at least six hours. The current invention will maintain food heated to 185° F. at least at a temperature of 141° F. in excess of six hours, for a time period of up to about fifteen hours. To open door 304, any pin or lock inserted through opening 386 is removed and door 304 is simply moved so that upper and lower rails 436 and 438 slide in upper and lower closure grooves 362 and 364, respectively. When the door is moved to open position 303, upper stop 458 will engage second end 368 of upper closure groove 362. Likewise, lower stop 448 will engage second end 376 of lower closure groove 364. When stops 448 and 458 are engaged with ends 368 and 376, stops 448 and 458 act as hinges so that door 304 is hingedly positioned in pan carrier body 302 and may rotate to the stowed position shown in FIG. 19. Pan cater body 302 may have a slot 470 in which ear 430 is received, Slot 470 may have protrusions 472 to engage ear 430 and hold door 304 in the stowed position. If it is desired to fully remove door 304, the door can simply be manipulated so that lower stop 458 moves into release groove 382 and disengaged from pan carrier body 302, which will allow upper stop 448 to be disengaged from upper closure groove 362 and the door can simply be removed.

Food pan carrier 300 thus comprises a food pan carrier of two-piece working construction, which means that food pan door 304 and pan carrier body 302 cooperate to provide a seal in the closed position without the use of any other parts, such as separate hinges or other separate pieces. Door 304 and pan carrier body 302 work together to provide sealing engagement to hold food stored in food pan carrier 300 at the desired temperatures for the amounts of time set forth herein.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A food pan carrier comprising:
    a pan carrier body, the pan carrier body having a doorway through which food pans may be placed into or removed from a food receiving cavity defined by the pan carrier body, the pan carrier body defining a sealing surface circumscribing the doorway;
    a door for closing the doorway, the door being slidable between an open and a closed position, the body having grooves defined in opposed walls of the pan carrier body wherein the door moves toward the body sealing surface when it moves from the open to closed positions, and wherein the door sealingly engages the body sealing surface in the closed position.

2. The food pan carrier of claim 1, the body sealing surface comprising a seal bead, the seal bead circumscribing the doorway.

3. The food pan carrier of claim 2, the doorway comprising a generally rectangular doorway, wherein the door has a door sealing surface thereon for engaging the seal bead on the pan carrier body.

4. The food pan carrier of claim 3, wherein the door sealing surface on the door is circumscribed by a generally rectangular seal bead.

5. The food pan carrier of claim 1 the pan carrier body comprising:
    a bottom wall; and
    four side walls projecting upwardly from the bottom wall, the doorway being defined by the four side walls.

6. The food pan carrier of claim 1 the pan carrier body comprising:
    a bottom wall;
    left and right side walls;
    a rear side wall; and
    a top wall, the top wall, bottom wall and left and right side walls defining the doorway at a front of the pan carrier body.

7. The food pan carrier of claim 6, wherein rails at upper and lower edges of the door are slidable in the grooves.

8. A food pan carrier comprising:
    a pan carrier body defining a cavity for receiving and carrying food pans, the pan carrier body having a door opening through which food pans can be inserted and removed;
    a body sealing surface on the pan carrier body circumscribing the door opening; and
    a door for covering the door opening of the pan carrier body, the door having a door sealing surface wherein the pan carrier body has first and second grooves defined therein sloping from a second end to a first end thereof in a direction toward the body sealing surface, the door being slidable in the grooves between a fully open position and a closed position, wherein in the closed position the door sealing surface sealingly engages the body sealing surface.

9. The food pan carrier of claim 8, wherein the door has first and second rails, the first and second rails being receivable in the first and second grooves.

10. The food pan carrier of claim 8, wherein the first and second rails slope from a second end to a first end thereof toward the body sealing surface.

11. The food pan carrier of claim 8, the pan carrier body comprising:
    a bottom wall;
    two side walls connected to and projecting from the bottom wall;
    a rear wall connected to and projecting from the bottom wall; and
    a top wall connected to an upper end of the side walls and the rear wall, the top wall, bottom wall, and two side walls defining the body sealing surface circumscribing the door opening.

12. The food pan carrier of claim 11, the first and second grooves being located forward of the body sealing surface.

13. The food pan carrier of claim 12, the door having:
    a top edge;
    a bottom edge; and
    left and right side edges, the top and bottom edges having top and bottom rails, respectively, projecting therefrom along at least a portion of the length thereof, the top and bottom rails being slidable in the first and second grooves.

14. The food pan carrier of claim 13, the door being rotatable in the first and second grooves when the door is in the open position.

15. The food pan carrier of claim 13, the door having hinge pins integrally formed therewith, wherein the hinge pins will engage an end of the first and second grooves in the pan carrier body when the door is in the open position, the door being rotatable in the grooves to a location adjacent one of the side walls.

16. The food pan carrier of claim 8, wherein the pan carrier body comprises:
    a bottom wall;
    a plurality of side walls projecting from the bottom wall; and
    the door opening being defined by the plurality of side walls.

17. The food pan carrier of claim 16, wherein two opposed side walls have the first and second grooves defined therein above the body sealing surface, and wherein the door is slidable in the first and second grooves between the open and closed positions.

18. A food pan carrier comprising:
    a pan carrier body comprising:
        a bottom wall;
        left and right side walls;

a rear side wall; and a top wall, the top wall, bottom wall and left and right side walls defining a doorway through which food pans may be placed into or removed from a food receiving cavity defined by the pan carrier body, the pan carrier body defining a body sealing surface circumscribing the doorway;

closure grooves defined in the pan carrier body, and a door for closing the doorway, wherein the door is slidable between an open and a closed position in the closure grooves and wherein the door sealingly engages the body sealing surface in the closed position, the door having an upper pivot pin and a lower pivot pin projecting from the upper and lower edges, respectively, thereof, the door being rotatable in the closure grooves when the door is in the open position.

19. The food pan carrier of claim 18, wherein the upper and lower pivot pins will engage terminal ends of the closure grooves and will pivot about the terminal ends.

20. The food pan carrier of claim 19, wherein an exit groove is connected with one of the closure grooves, so that one of upper and lower pivot pins can be moved into the exit groove to allow the door to be completely removed from the pan carrier body.

* * * * *